United States Patent
Johnson et al.

(10) Patent No.: US 8,380,760 B2
(45) Date of Patent: *Feb. 19, 2013

(54) SYSTEM AND METHOD FOR AUTOMATED DEPLOYMENT OF AN INFORMATION HANDLING SYSTEM

(75) Inventors: Jeremiah Johnson, Georgetown, TX (US); Steve Oates, Georgetown, TX (US); Kurt Stonecipher, Austin, TX (US); Greg Bomsta, Maple Grove, MN (US); Kevin Hanes, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/161,943

(22) Filed: Jun. 16, 2011

(65) Prior Publication Data
US 2011/0246515 A1  Oct. 6, 2011

Related U.S. Application Data

(63) Continuation of application No. 12/040,206, filed on Feb. 29, 2008, now Pat. No. 7,987,211.

(51) Int. Cl.
*G06F 17/30* (2006.01)
(52) U.S. Cl. .......................... 707/804; 707/793; 707/805
(58) Field of Classification Search .................. None
See application file for complete search history.

(56) References Cited

U.S. PATENT DOCUMENTS

| | | | | |
|---|---|---|---|---|
| 5,710,884 A * | 1/1998 | Dedrick | | 709/217 |
| 6,385,766 B1 | 5/2002 | Doran, Jr. et al. | | 717/11 |
| 6,490,723 B1 | 12/2002 | Bearden et al. | | 717/174 |
| 6,538,669 B1 | 3/2003 | Lagueux, Jr. et al. | | 345/764 |
| 6,564,220 B1 | 5/2003 | Huber et al. | | 707/100 |
| 6,714,937 B1 | 3/2004 | Eynon et al. | | 707/102 |
| 6,738,077 B1 | 5/2004 | Wendker et al. | | 715/744 |
| 6,745,239 B1 | 6/2004 | Hubbard | | 709/220 |
| 6,760,708 B1 | 7/2004 | Hubbard et al. | | 705/27 |
| 6,912,552 B2 | 6/2005 | Hubbard et al. | | 707/204 |
| 7,158,977 B2 | 1/2007 | Challener et al. | | 1/1 |
| 7,216,200 B2 | 5/2007 | Zhang et al. | | 711/114 |
| 7,272,639 B1 * | 9/2007 | Levergood et al. | | 709/218 |
| 7,284,042 B2 | 10/2007 | Beadles et al. | | 709/220 |
| 7,293,034 B2 * | 11/2007 | Paya et al. | | 1/1 |
| 7,353,234 B2 | 4/2008 | Kimball et al. | | 1/1 |
| 7,543,232 B2 | 6/2009 | Easton et al. | | 715/708 |
| 7,721,259 B2 | 5/2010 | Heinke et al. | | 717/121 |
| 7,954,090 B1 | 5/2011 | Qureshi et al. | | 717/168 |
| 2002/0046099 A1 | 4/2002 | Frengut et al. | | 705/14 |

(Continued)

OTHER PUBLICATIONS

Bisher et al.; "Method, Software and System for Deploying, Managing and Restoring Complex Information Handling System and Storage"; U.S. Appl. No. 10/755,791; Assignee: Dell Products L.P.; (DC-05830); pp. 51, Date Filed Jan. 12, 2004.

(Continued)

*Primary Examiner* — Debbie Le
(74) *Attorney, Agent, or Firm* — Baker Botts L.L.P.

(57) ABSTRACT

A system and method for automated deployment of an information handling system are disclosed. A method for managing the deployment of an information handling system may include executing a deployment application on an information handling system, the deployment application including one or more tasks associated with the deployment of the information handling system. The method may further include automatically determining for a particular task whether an execution time for the particular task is within a predetermined range of execution times. The method may further include automatically performing an error-handling task in response to determining that the execution time for the particular task is not within the predetermined range of execution times.

26 Claims, 25 Drawing Sheets

U.S. PATENT DOCUMENTS

| | | | |
|---|---|---|---|
| 2003/0200149 A1 | 10/2003 | Gonzalez et al. | 705/26 |
| 2003/0212768 A1 | 11/2003 | Sullivan | 709/220 |
| 2004/0054995 A1 | 3/2004 | Lee | 717/173 |
| 2004/0139130 A1 | 7/2004 | Hubbard et al. | 707/204 |
| 2005/0028082 A1 | 2/2005 | Topalov et al. | 715/505 |
| 2005/0114339 A1 | 5/2005 | Challener et al. | 707/10 |
| 2005/0198631 A1 | 9/2005 | Bisher et al. | 717/178 |
| 2005/0240639 A1 | 10/2005 | Hubbard et al. | 707/205 |
| 2005/0273655 A1 | 12/2005 | Chow et al. | 714/16 |
| 2006/0095755 A1 | 5/2006 | Hanes et al. | 713/2 |
| 2006/0239568 A1 | 10/2006 | Hanes et al. | 382/233 |
| 2006/0277340 A1 | 12/2006 | Mar et al. | 710/104 |
| 2006/0288093 A1 | 12/2006 | Raley et al. | 709/223 |
| 2007/0002736 A1 | 1/2007 | Gade et al. | 370/230 |
| 2007/0041386 A1 | 2/2007 | Mar et al. | 370/395.52 |
| 2007/0157192 A1 | 7/2007 | Hoefler et al. | 717/168 |
| 2007/0168962 A1 | 7/2007 | Heinke et al. | 717/120 |
| 2007/0169116 A1 | 7/2007 | Gujarathi et al. | 717/174 |
| 2007/0180448 A1 | 8/2007 | Low et al. | 718/1 |
| 2007/0186212 A1 | 8/2007 | Mazzaferri et al. | 718/1 |
| 2007/0220032 A1 | 9/2007 | Kapoor et al. | 707/102 |
| 2007/0239861 A1 | 10/2007 | Reeves et al. | 709/222 |
| 2008/0189350 A1 | 8/2008 | Vasa et al. | 709/201 |
| 2008/0294798 A1 | 11/2008 | Lynch | 709/248 |
| 2008/0301672 A1 | 12/2008 | Rao et al. | 717/177 |
| 2009/0063179 A1 | 3/2009 | Huang | 705/1 |
| 2009/0132331 A1 | 5/2009 | Cartledge et al. | 705/9 |
| 2009/0144514 A1 | 6/2009 | Lamantia et al. | 711/505 |
| 2009/0222483 A1 | 9/2009 | Johnson et al. | 707/104.1 |
| 2009/0222813 A1 | 9/2009 | Johnson et al. | 717/174 |
| 2009/0222826 A1 | 9/2009 | Johnson et al. | |
| 2010/0223325 A1* | 9/2010 | Wendker et al. | 709/203 |

OTHER PUBLICATIONS

Briand et al. Microsoft Content Management Server Field Guide, Chapter 8, pp. 135-163; Springerlink date: Nov. 22, 2006.

* cited by examiner

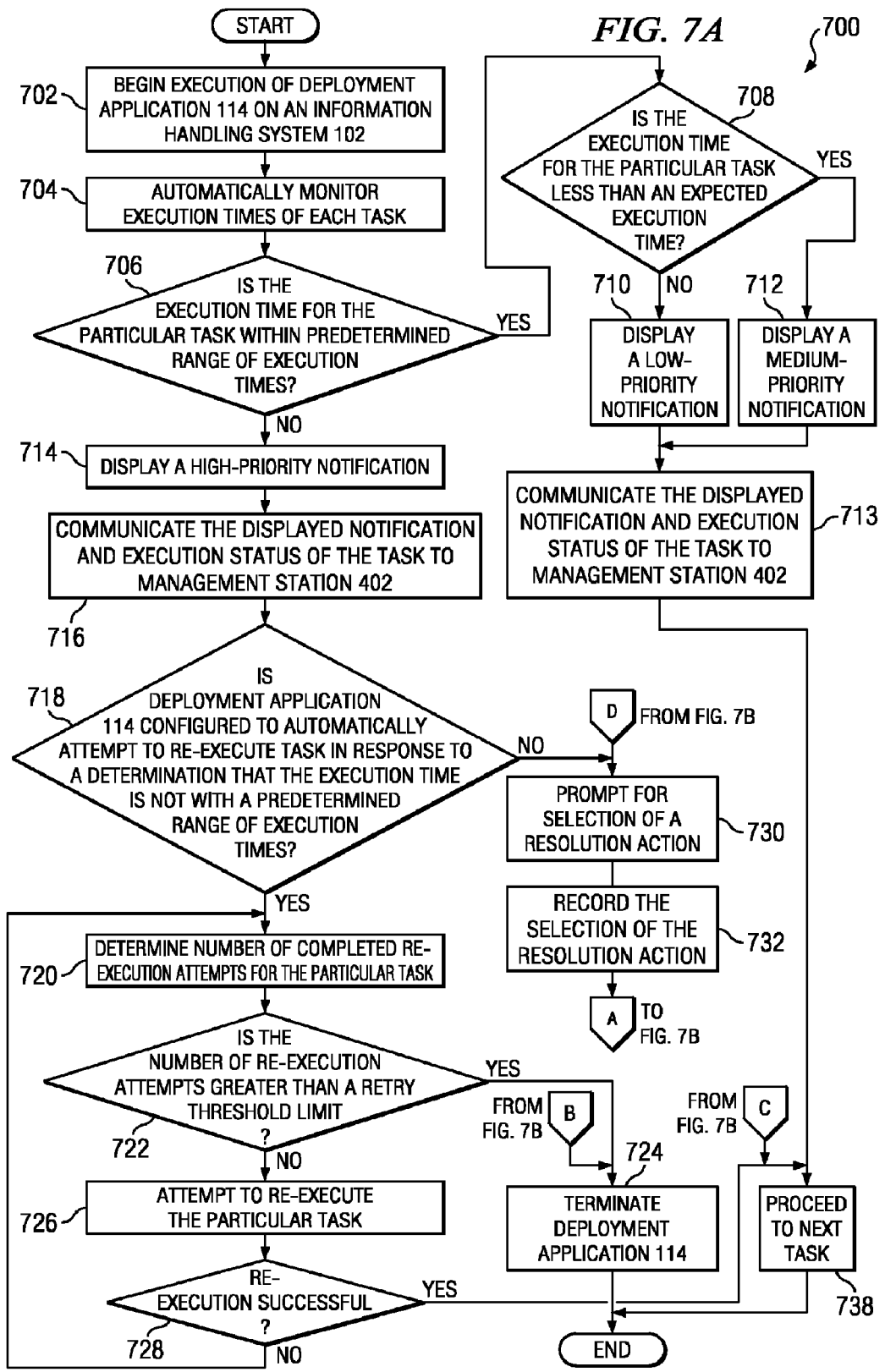

SYSTEM AND METHOD FOR AUTOMATED DEPLOYMENT OF AN INFORMATION HANDLING SYSTEM

RELATED APPLICATIONS

This application is a continuation of U.S. patent application Ser. No. 12/040,206 filed Feb. 29, 2008, now U.S. Pat. No. 7,987,211 B2, the contents of which is incorporated herein in its entirety by this reference.

TECHNICAL FIELD

The present disclosure relates in general to information handling system deployment, and more particularly to a system and method for automated deployment of a deployment container on an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As features and capabilities of information handling systems have increased, and the costs of information handling systems have decreased, companies have increased their use of information handling systems in their day-to-day business. Nowadays, it has become common for many companies to use numerous information handling systems, sometimes on the order of hundreds, thousands, and tens-of-thousands, in connection with their operations. However, in many environments, before such information handling systems may be used by their respective end users, a data including an operating system and one or more application programs is deployed on each information handling system. In addition, oftentimes data and settings from a second information handling system must be migrated in scenarios where the deployed information handling system is to replace the second information handling system. Such deployment and configuration of numerous information handling systems can often be a complex process. Deployments may be even more complex in situations in which the physical and/or hardware characteristics of the multiple information handling systems differ, and in situations in which different operating systems, application programs, and data are deployed based on a characteristic of an end user (e.g., the end user's line of business, title, position, etc.).

Traditionally, companies have configured and installed information handling systems from a network share. However, storing content necessary to configure and deploy a plurality of information handling systems on a network may be costly, as such content can consume several gigabytes of storage space and such content is often replicated to multiple servers. Synchronization of these content repositories may also provide a challenge and increase complexity. In addition, network deployment is often difficult to fully automate and may require significant labor to develop customizations and complete configurations of individual information handling systems post-deployment. Accordingly, systems and methods that provide for decreased complexity and increased management capability over traditional deployment techniques are desired.

SUMMARY

In accordance with the teachings of the present disclosure, disadvantages and problems associated with deployment of an information handling system may be substantially reduced or eliminated.

In accordance with one embodiment of the present disclosure a method for automated deployment of an information handling system is provided. The method may include receiving at an information handling system identifying information from a source local to the information handling system, the identifying information identifying a particular one of a plurality of profiles. The method may also include automatically identifying the particular profile associated with the information handling system based on at least the identifying information received from the local source. The method may additionally include automatically accessing a database to access available profile information associated with the particular profile, and identify unavailable supplemental profile information associated with the particular profile for deploying the information handling system. The method may further include automatically generating a customized user interface at the information handling system for inputting the supplemental profile information unavailable to the database, the customized user interface being customized based on at least the unavailable supplemental profile information. Moreover, the method may include receiving the supplemental profile information via the customized user interface, and automatically deploying the information handling system based on at least one of the identifying information, the profile information accessed from the database, and the supplemental profile information received via the customized user interface.

In accordance with another embodiment of the present disclosure, an information handling system may include a processor, a memory communicatively coupled to the processor, and local computer-readable media communicatively coupled to the processor. The computer-readable media may have stored thereon a database and a program of instructions. The program of instructions may be executable by the processor and operable to when executed (a) receive identifying information from a source local to the information handling system, the identifying information identifying a particular one of a plurality of profiles; (b) automatically identify the particular profile associated with the information handling system based on at least the identifying information received from the local source; (c) automatically access the database to access available profile information associated with the particular profile, and identify unavailable supplemental profile information associated with the particular profile for deploying the information handling system; (d) automatically generate a customized user interface for inputting the supplemental profile information unavailable to the database, the customized user interface being customized based on at least the unavailable supplemental profile information; (e) receive the supplemental profile information via the customized user interface; and (f) automatically deploy the information handling system based on at least one of the identifying information, the profile information accessed from the database, and the supplemental profile information received via the customized user interface.

In accordance with an additional embodiment of the present disclosure, a method for automated deployment an information handling system is provided. The method may include storing a database on computer-readable media, the database including profile information associated with one or more profiles. The method may also include storing a program of instructions on computer-readable media. The program of instructions may be operable to, when executed on an information handling system (a) receive identifying information from a source local to the information handling system, the identifying information identifying a particular one of a plurality of profiles; (b) automatically identify the particular profile associated with the information handling system based on at least the identifying information received from the local source; (c) automatically access the database to access available profile information associated with the particular profile, and identify unavailable supplemental profile information associated with the particular profile for deploying the information handling system; (d) automatically generate a customized user interface for inputting the supplemental profile information unavailable to the database, the customized user interface being customized based on at least the unavailable supplemental profile information; (e) receive the supplemental profile information via the customized user interface; and (f) automatically deploy the information handling system based on at least one of the identifying information, the profile information accessed from the database, and the supplemental profile information received via the customized user interface.

In accordance with a further embodiment of the present disclosure, a method for automated configuration of a plurality of information handling systems is provided. Each information handling system may include a local computer-readable medium having the same set of uninstalled data images stored thereon. The method may include receiving at a particular one of the information handling systems identifying information from a source local to the particular information handling system, the identifying information associated with a particular profile. The method may also include automatically determining a subset of data images corresponding to the identifying information received from the local source, the subset of data images comprising one or more data images from the set of uninstalled data images. The method may further include installing the determined subset of data images from the set of data images stored on the local computer-readable medium of the particular information handling system.

In accordance with yet another embodiment of the present disclosure, a method for automated configuration of an information handling system, may be provided. The method may include storing a set of uninstalled data images on each of a plurality of information handling systems. The method may also include storing a program of instructions on each of the plurality of information handling systems. The program of instructions may be operable to, when executed (a) receive at a particular one of the information handling systems identifying information from a source local to the particular information handling system, the identifying information associated with a particular profile; (b) automatically determine a subset of data images corresponding to the identifying information received from the local source, the subset of data images comprising one or more data images from the set of uninstalled data images; and (c) install the determined subset of data images from the set of data images stored on the local computer-readable medium of the particular information handling system.

In accordance with yet another embodiment of the present disclosure, and information handling system may include a processor, a memory communicatively coupled to the processor, and a local computer-readable media communicatively coupled to the processor. The computer-readable media may have stored thereon (a) a set of installed data images, and (b) a program of instructions executable by the processor. The program of instructions may be operable to, when executed (a) receive at the information handling system identifying information from a source local to the information handling system, the identifying information associated with a particular profile; (b) automatically determine a subset of data images corresponding to the identifying information received from the local source, the subset of data images comprising one or more data images from the set of uninstalled data images; and (c) install the determined subset of data images from the set of data images stored on the local computer-readable media of the information handling system.

In accordance with yet another embodiment of the present disclosure, a method for managing the deployment of an information handling system is provided. The method may include executing a deployment application on an information handling system, the deployment application including one or more tasks associated with the deployment of the information handling system. The method may further include automatically determining for a particular task whether an execution time for the particular task is within a predetermined range of execution times. The method may further include automatically performing an error-handling task in response to determining that the execution time for the particular task is not within the predetermined range of execution times.

In accordance with yet another embodiment of the present disclosure, a method for remotely managing the deployment of a plurality of information handling systems may be provided. The method may include executing a deployment application including one or more tasks associated with the deployment of the information handling system on each of the plurality of information handling systems. The method may also include communicating an execution status of the one or more tasks from each of the information handling systems to a management station remote from the information handling systems such that the execution status of the at least one task is displayed at the remote management station.

In accordance with yet another embodiment of the present disclosure a system for remotely managing the deployment of one or more information handling systems may include a management station and a plurality of information handling systems communicatively coupled to the management station and remotely located from the management station. Each of the plurality of information handling systems may be configured to execute a deployment application including one or more tasks associated with the deployment of the information handling system and communicate an execution status of the one or more tasks from the information handling system to the management station. The management station may be configured to display the execution status of tasks associated with the one or more information handling systems.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 7A and 7B illustrate a flow chart of an example method for managing a deployment of information handling system, in accordance with the present disclosure;

DETAILED DESCRIPTION

Preferred embodiments and their advantages are best understood by reference to FIGS. 1-9B, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such wires, optical fibers, microwaves, radio waves, and other electromagnetic and/or optical carriers; and/or any combination of the foregoing.

For the purposes of this disclosure, a deployment container include a set of uninstalled data images comprising data and/or other information that may be used to install one or more operating systems, application programs, operating system drivers, synchronization content, migration rules for data and/or settings (e.g., data and/or settings for an existing information handling system to be replaced during deployment), and/or other data on an information handling system. In some embodiments, a deployment container may include a Windows Imaging Format (WIM) file and/or other suitable files.

Figure 1A:
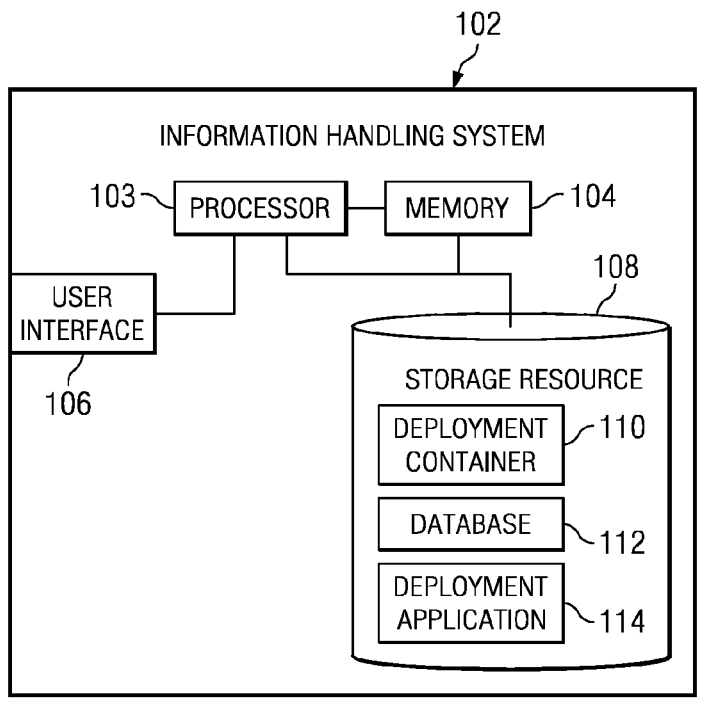
FIG. 1A illustrates a block diagram of an example information handling system before a deployment container is deployed on the information handling system, in accordance with the present disclosure.

FIG. 1A illustrates a block diagram of an example information handling system 102 before a deployment container is deployed on information handling system 102, in accordance with the present disclosure. In some embodiments, information handling system 102 may be a portable computer (e.g., a "laptop" or "notebook"). In other embodiments, information handling system 102 may be a desktop computer (e.g., a "tower"). In other embodiments, information handling system 102 may be a server. As shown in FIG. 1A, information handling system 102 may include a processor 103, a memory 104 communicatively coupled to processor 103, a user interface 106 communicatively coupled to processor 103, and a storage resource 108 communicatively coupled to processor 103 and memory 104.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

User interface 106 may be communicatively coupled to processor 103 and may include any instrumentality or aggregation of instrumentalities by which a user may interact with information handling system 102. For example, user interface 106 may permit a user to input data and/or instructions into information handling system 102 (e.g., via a keyboard, pointing device, and/or other suitable means), and/or otherwise manipulate information handling system 102 and its associated components. User interface 106 may also permit information handling system 102 to communicate data to a user, e.g., by means of a display device.

Storage resource 108 may be communicatively coupled to processor 103 and/or memory 104 and may include any system, device, or apparatus operable to retain program instructions or data for a period of time (e.g., computer-readable media) and that retains data after power to information handling system 102 is turned off. Storage resource 108 may include one or more hard disk drives, magnetic tape libraries, optical disk drives, magneto-optical disk drives, compact disk drives, compact disk arrays, disk array controllers, and/or any computer-readable medium operable to store data. As depicted in FIG. 1A, storage resource 108 may include a deployment container 110, a database 112, and a deployment application 114. Although FIG. 1A depicts storage resource 108 as internal and local to information handling system 102, storage resource 108 may in certain embodiments be locally attached but external to information handling system 102 (e.g., a USB flash drive and/or an external hard drive). In other embodiments, storage resource 108 may be remote to information handling system 108 (e.g., connected via a network).

Deployment container 110 may include a set of uninstalled data images comprising data and/or other information that may be used to install one or more operating systems, application programs, operating system drivers, synchronization content, migration rules for data and/or settings (e.g., data and/or settings for an existing information handling system to be replaced during deployment), and/or other data on information handling system 102. In some embodiments, deployment container 110 may include a Windows Imaging Format (WIM) file and/or other suitable files.

Database 112 may include profile information associated with one or more respective profiles associated with a plurality of information handling systems 102 (e.g., one or more users or one or more classes of users). For example, for each particular profile, database 112 may include one or more parameters associated with the particular profile, for example the name of a class of users, an intended end user's name, username, email address, network domain, line of business (e.g., in an electronics company, "Desktop Computers," "Portable Computers," "Servers," "Software," "Monitors," "Microchips," "Storage," "Services"), geographic region (e.g., a cardinal and/or intercardinal direction, the name of a continent, country, state, and/or city), job title (e.g., "Director of Sales," "Senior Vice President of Legal"), job function (e.g., "manager," "administrator," "staff," "regular"), and/or department (e.g., management, sales, accounting, legal, factory, etc.).

Deployment application 114 may include a program of instructions operable to automatically determine, based on identifying information received at information handling system 102 and/or profile information stored in database 112, a subset of data images from deployment container 110 to install on information handling system 102. Deployment application 114 may also be operable to install the determined subset of data images as a deployed image 116 as shown in greater detail in FIG. 1B and as described in greater detail below with respect to FIG. 2. In some embodiments, deployment application 114 may be a part of and/or compatible with Windows Preinstallation Environment (WindowsPE) and/or other suitable preinstallation configuration utility.

Although FIG. 1A depicts that storage resource 108 includes each of deployment container 110, database 112, and deployment application 114, in certain embodiments, one or more of deployment container 110, database 112 and/or deployment application 114 may be stored externally and/or remotely from information handling system 102. For example, in one embodiment, storage resource 108 may include deployment container 110 and deployment application 114, but database 112 may be stored on a computer-readable medium remote to information handling system 102. In another embodiment, storage resource may include deployment application 114, but database 112 and/or deployment application 114 may be stored on a computer-readable medium external to but locally attached to information handling system 102 (e.g., a USB flash drive and/or an external hard drive).

In addition, although FIG. 1A depicts deployment container 110, database 112 and deployment application 114 as separate components, deployment container 110 may include one or both of database and deployment application 114 in certain embodiments.

Figure 2:
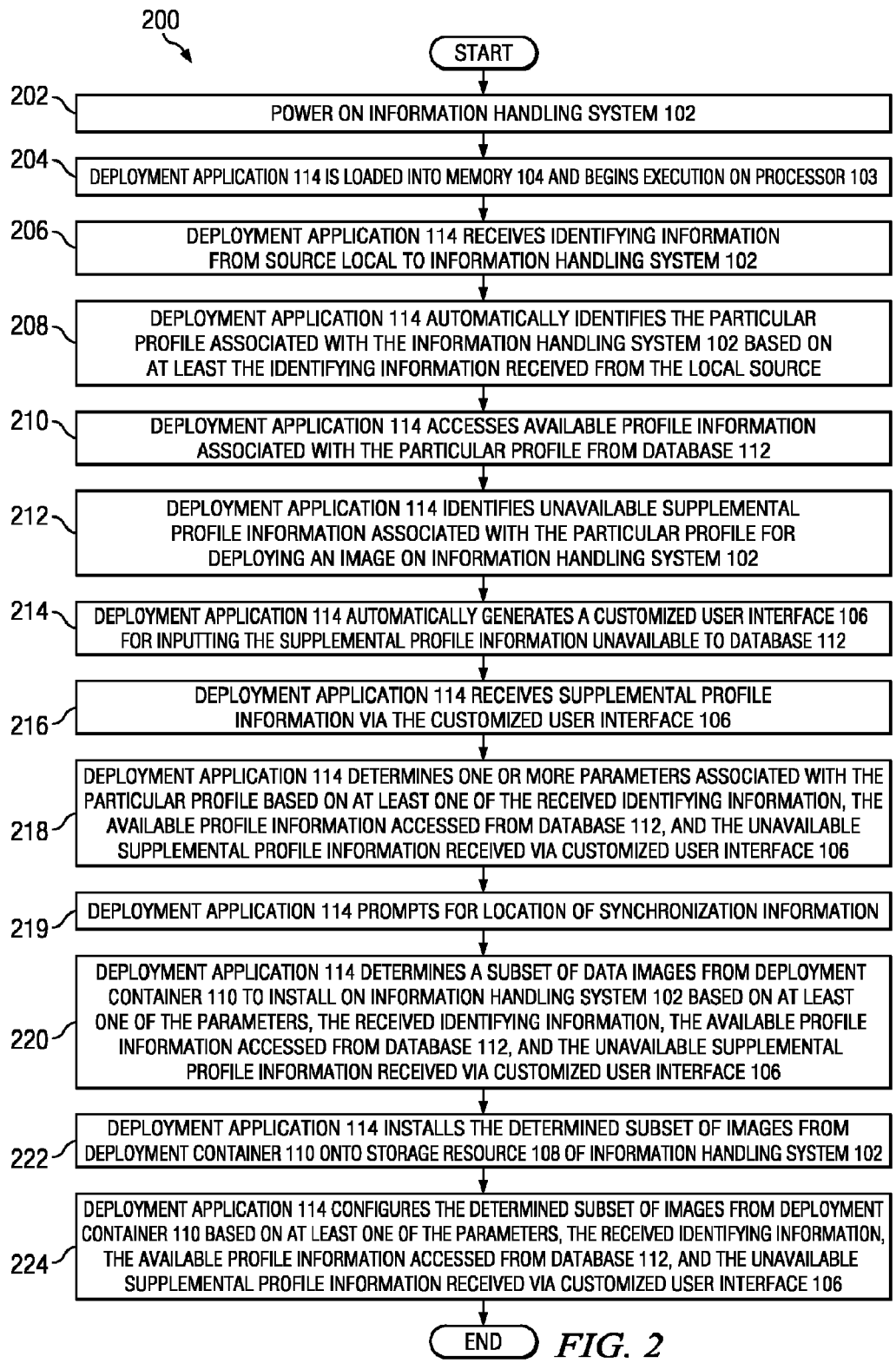
FIG. 2 illustrates a flow chart of an example method for automated deployment of an information handling system, in accordance with the present disclosure.

FIG. 2 illustrates a flow chart of an example method 200 for automated deployment of deployment container 110 on an information handling system 102, in accordance with the present disclosure. FIGS. 3A-3F illustrate example user interface screens that may be displayed at information handling system 102 during execution of method 200. According to one embodiment, method 200 preferably begins at step 202. As noted above, teachings of the present disclosure may be implemented in a variety of configurations of information handling system 102. As such, the preferred initialization point for method 200 and the order of the steps 202-224 comprising method 200 may depend on the implementation chosen.

At step 202, a person (e.g., an information technology professional or an end user) may power on information handling system 102. In certain embodiments, step 202 may occur after an information handling system has been physically deployed to its intended location (e.g., the desk or workstation of a particular user). At step 204, information handling system 102 may load deployment application 114 into memory 104 and begin execution of deployment application on processor 103.

At step 206, deployment application 114 may receive identifying information from a source local to information handling system 102. The identifying information may identify a particular profile that relates to one or a plurality of profiles (e.g., wherein each profile may be associated with a respective end user and/or a respective end users), and may include any suitable identifying information for the particular profile, for example, the name of the profile, the name of a particular end user, the username of a particular end user, an identification number of a particular end user (e.g., employee identification number and/or social security number), a serial number of information handling system 102, a service code of information handling system 102, and/or other identifying characteristic of information handling system 102.

Figure 3A:
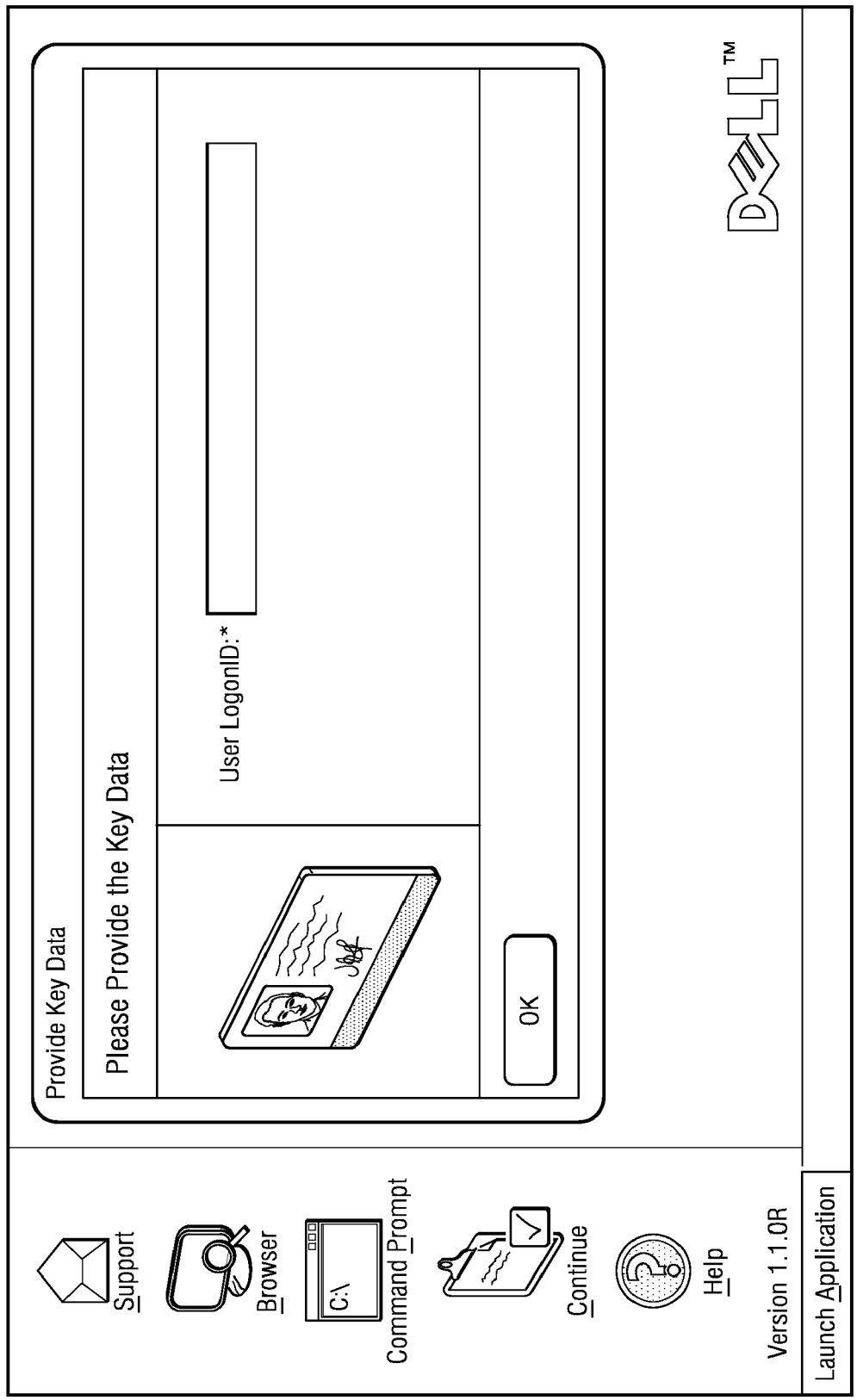
FIGS. 3A-3F illustrate example user interface screens displayed during a method for automated deployment of an information handling system, in accordance with an embodiment of the present disclosure.
Figure 3B:
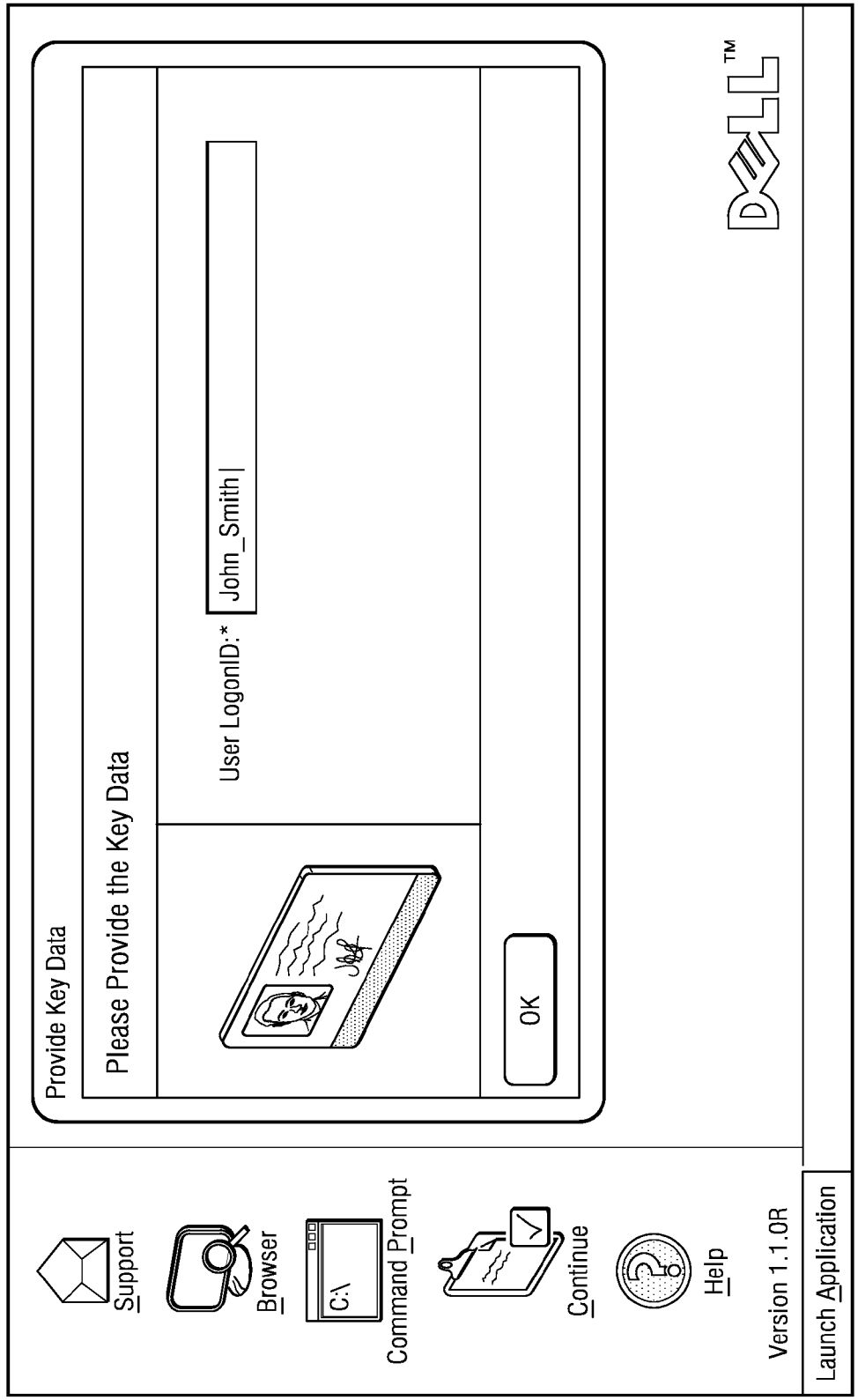

The identifying information may be received from any suitable source local to information handling system 102. For example, in some embodiments, deployment application 114 may prompt a person (e.g., the particular end user, network administrator, or an information technology specialist) via user interface 106 to enter a name, username, and/or other identifying information relating to the profile, such as depicted in FIG. 3A, for example. In such embodiments, the person prompted may enter identifying information into user interface 106, e.g., as depicted in FIG. 3B. In the same or alternative embodiments, deployment application 114 may read identifying information (e.g., a serial number and/or service code) from data stored on storage resource 108 and/or another component of information handling system 102.

At step 208, deployment application 114 may automatically identify the particular profile for information handling system 102 (e.g., a particular end user or particular class of end user may be assigned to each information handling system 102) based on at least the identifying information received from the local source. For example, deployment application 114 may access database 112 and compare one or more entries therein to identify the particular profile (e.g., particular end user or particular class of end users) based on the received identifying information.

At step 210, deployment application 114 may access available profile information associated with the identified particular profile from database 112. For example, database 112 may include available profile information for some parameters associated with the particular profile (e.g., name, email address, network domain, operating system), but may not include or may be missing profile information for other parameters (e.g., line of business, region).

At step 212, deployment application 114 may identify categories of profile information (e.g., the unavailable or "missing" profile parameters) for the particular profile that are not available or missing from database 112. Such unavailable or missing profile information, which may be required or useful for installing and/or configuring information handling system 102, may be referred to herein as "supplemental profile information."

Figure 3C:
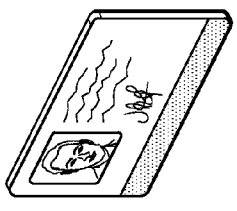

At step 214, deployment application 114 may automatically generate a customized user interface 106 for inputting the supplemental profile information unavailable to or missing from database 112. For example, as depicted in FIG. 3C, deployment application may generate a customized user interface that includes the identifying information received from the local source (e.g., "UserLoginID" of "John_Smith"), the available profile information accessed from database 112 (e.g., "Firstname" of "John," "Lastname" of "Smith," "Primary Email" of "John_Smith@ApertureLabs.com," "OS" of "Windows XP Professional," and "Primary Domain" of "AMERICAS"), and blank entry forms for a person to enter unavailable supplemental profile information (e.g., "Line of Business," and "Region").

Figure 3D:
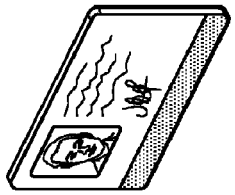
Figure 3E:
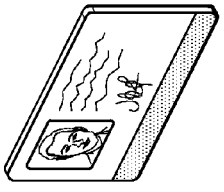

At step 216, deployment application 114 may receive supplemental profile information via the customized user interface 106. For example, as shown in FIGS. 3D and 3E, a user may select "Sales" as the particular profile's "Line of Business," and may select "North" as the particular profile's "Region" from possible selections "South," "North," "East," and "West."

At step 218, deployment application 114 may determine one or more parameters (e.g., name, email address, network domain, operating system, line of business, region, etc.) associated with the particular profile based on at least one of the identifying information received from the local source, the available profile information accessed from database 112, and the supplemental profile information received via customized user interface 106.

Figure 3F:
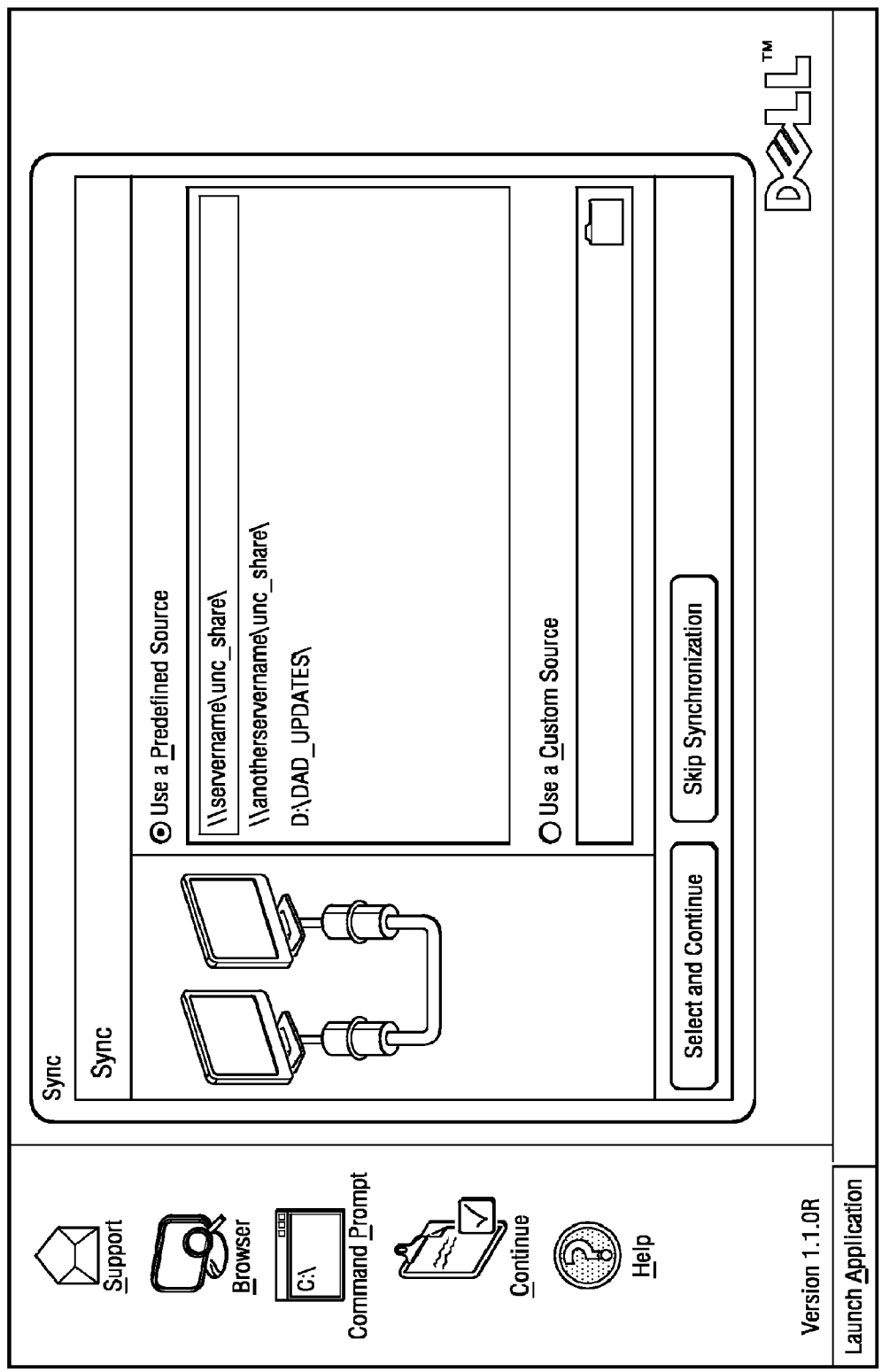

At step 219, deployment application may prompt a person to input a location of synchronization information for the deployment, as depicted in FIG. 3F. In certain embodiments, deployment container 110 pre-loaded onto information handling system 102 may include out-of-date data (e.g., deployment container 110 may include data for a particular version of an application program and/or operating system, but a new version or patch may have been released after deployment container 110 was pre-loaded but before the information handling system 102 is delivered to its intended location). Accordingly, step 219 may allow for updating of deployment container 110 so that up-to-date software and/or configurations may be applied.

At step 220, deployment application 114 may determine a subset of one or more data images from deployment container 110 to install on information handling system 102 based on at least one of the parameters, the identifying information received via the local source, the available profile information accessed from database 112, and the supplemental profile information received via customized user interface 106. For example, based on the "OS" parameter for user "John_Smith," deployment application 114 may determine that Windows XP Professional included in the deployment container 110 is to be installed on information handling system 102. As another example, based on the "Line of Business" parameter of "Sales" for "John_Smith," deployment application 114 may determine that sales-based software (e.g., forecasting software) included in the deployment container 110 is to be installed on information handling system 102.

Figure 1B:
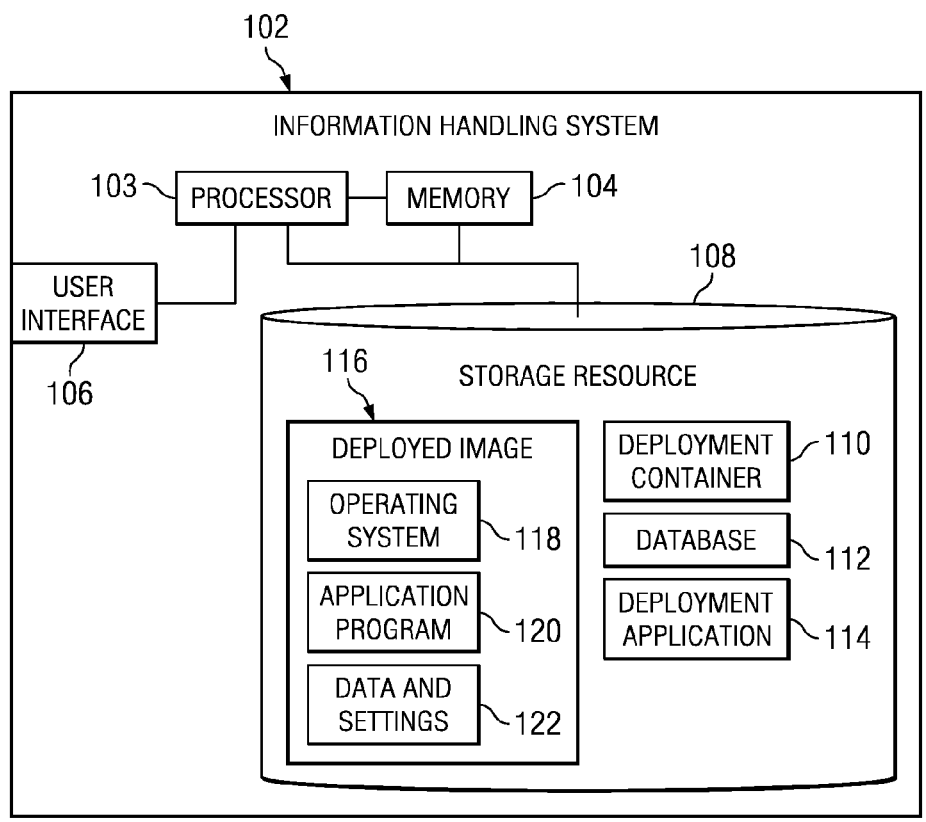
FIG. 1B illustrates a block diagram of the information handling system of FIG. 1A after a deployment container is deployed on the information handling system, in accordance with the present disclosure.

At step 222, deployment application 114 may install the determined subset of data images from deployment container 110 on storage resource 108 of information handling system 102, as described in greater detail in this disclosure. After completion of step 222, storage resource 108 may include a deployed image 116 including an operating system 118, one or more application programs 120, and/or data and settings 122, as shown in FIG. 1B. In certain embodiments, data and settings 122 may include data and/or settings from another information handling system that was replaced by information handling system 102 (e.g., Internet bookmarks and/or favorites, user interface configuration, available printers, network drives, and/or other peripherals).

At step 224, deployment application 114 may configure the determined subset of data images based on at least one of the parameters, the identifying information received from the local source, the available profile information accessed from database 112, and the supplemental profile information received via customized user interface 106. As an example, configuration may include setting one or more settings related to the data images installed at step 222 (e.g., Internet bookmarks and/or favorites, user interface configuration, available printers, network drives, and/or other peripherals).

After completion of step 224, method 200 may end. In some embodiments, deployment application 114 may delete one or more of deployment container 110, database 112, and/or itself after completion of method 200. In the same or alternative embodiments, method 200 may be also be executed on each of a plurality of information handling systems 102, thus allowing for customized installation and/or configuration of each of the plurality of information handling systems 102.

Although FIG. 2 discloses a particular number of steps to be taken with respect to method 200, it is understood that method 200 may be executed with greater or fewer steps than those depicted in FIG. 2. In addition, although FIG. 2 discloses a certain order of steps to be taken with respect to method 200, the steps comprising method 200 may be completed in any suitable order. Method 200 may be implemented using information handling system 200 or any other system operable to implement method 200. In certain embodiments, method 200 may be implemented partially or fully in software embodied in tangible computer-readable media.

Figure 4:
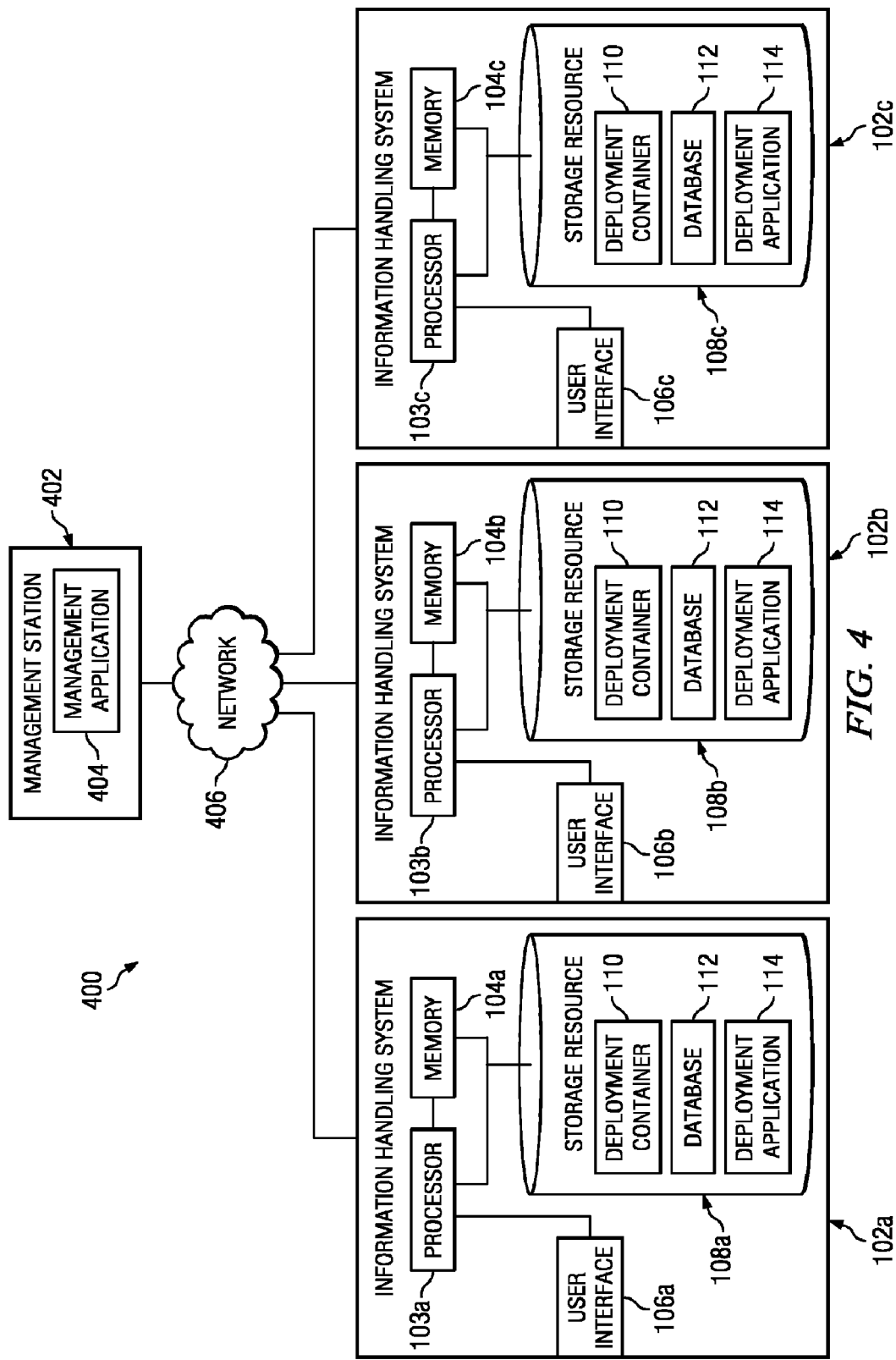
FIG. 4 illustrates a block diagram of an example system for deploying a plurality of information handling systems, in accordance with the present disclosure.

FIG. 4 illustrates a block diagram of an example system 400 for deploying a plurality of information handling systems 102, in accordance with the present disclosure. System 400 may include a management station 402, a network 406, and a plurality of information handling systems 102a, 102b, and 102c. In this disclosure, information handling systems 102a, 102b, and 102c may be referred to collectively as "information handling systems 102" or generically as "information handling system 102."

Management station 402 may include an information handling system and may generally be operable to receive data from and/or communicate data to one or more of information handling systems 102 via network 406. In certain embodiments, management station 402 may be a server. In another embodiment, management station 402 may be a personal computer. As depicted in FIG. 4, management station 402 may include a management application 404.

Management application 404 may include any program of instructions embodied on a computer-readable medium and operable to, when executed, process data received from information handling systems 102 and/or transmit data and/or instructions to information handling systems 102. Management application 404 may also be operable to remotely manage and/or monitor deployment and/or configuration of data images on information handling systems 102, as discussed in greater detail below. In some embodiments, management application 404 may employ simple network management protocol (SNMP) to communicate with, manage, and/or monitor information handling systems 102.

Network 406 may be a network and/or fabric configured to communicatively couple management station 402 to information handling systems 102. Network 406 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data), or any combination thereof.

Network 406 may transmit data using wireless transmissions and/or wire-line transmissions via any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 406 and its various components may be implemented using hardware, software, or any combination thereof.

As shown in FIG. 4, each of information handling systems 102 may be similar to information handling system 102 depicted in FIG. 1A. In some embodiments, the plurality of information handling systems 102 may each include an identical or similar deployment container 110, an identical or similar database 112, and/or an identical or similar deployment application 114. In operation, the deployment application 114 on each information handling system 102 may execute to deploy and/or customize that information handling system 102, wherein the deployment and/or configuration on each information handling system 102 is customized based on identifying information received locally by that information handling system 102, available profile information accessed from the relevant database 112, and supplemental profile information received during execution of deployment application 114 (see, e.g., method 200).

Although FIG. 4 depicts system 400 having three information handling systems 102, system 400 may include any suitable number of information handling systems 102. In addition, although FIG. 4 depicts each information handling system 102 communicatively coupled to management station 402 via network 406, one or more of information handling systems 102 may not be coupled to management station 402 in some embodiments. In such embodiments, the customized deployment and/or configuration on each information handling system 102 may be locally managed and/or monitored.

Figure 5:
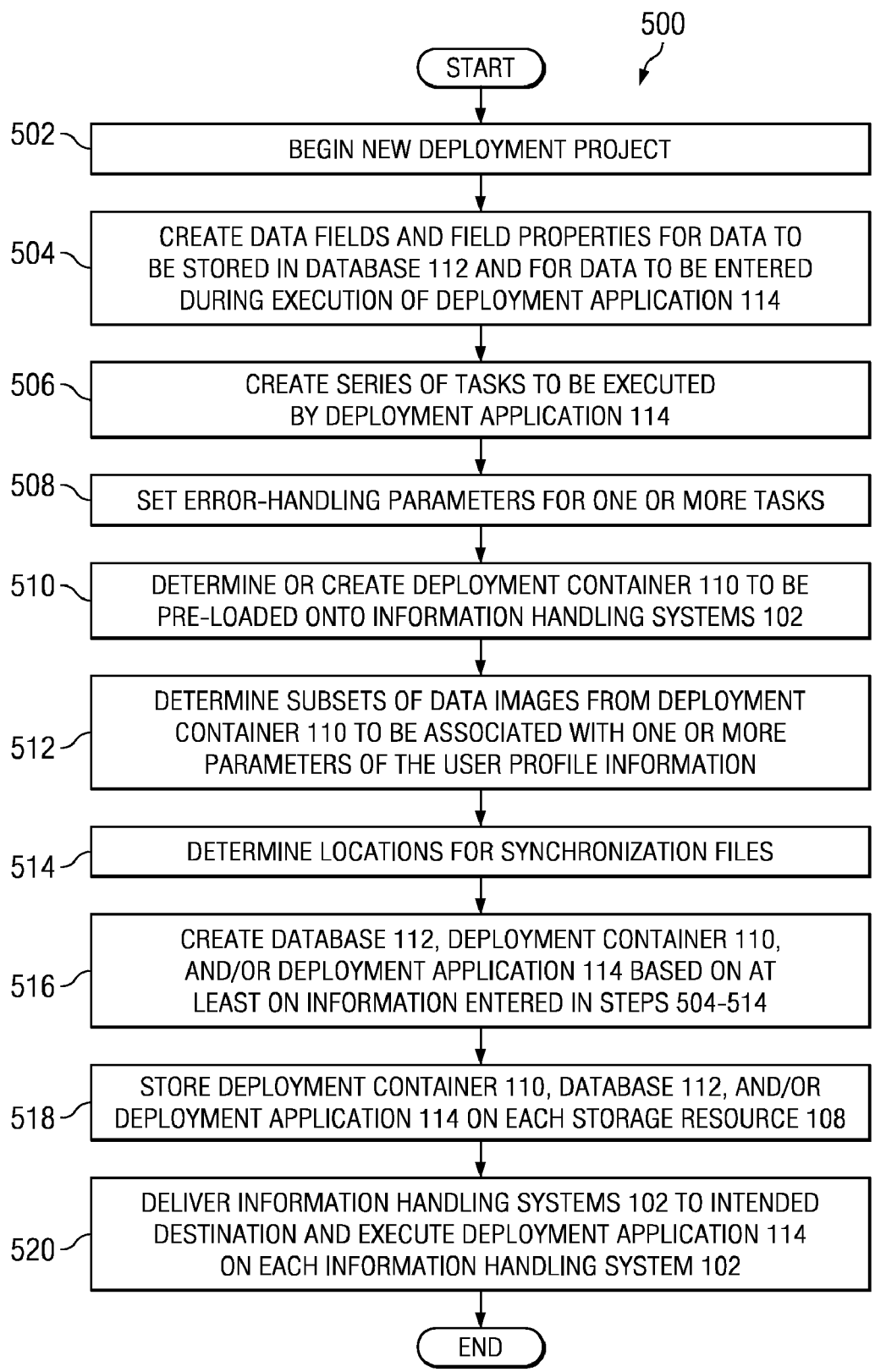
FIG. 5 illustrates a flow chart of an example method for creating data to be used for an automated deployment of a plurality of information handling systems, in accordance with the present disclosure.

FIG. 5 illustrates a flow chart of an example method 500 for creating data to be used for an automated deployment of a plurality of information handling systems 102, in accordance with the present disclosure. FIGS. 6A-6G illustrate example user interface screens that may be displayed on management station 402 during execution of method 500, in accordance with an embodiment of the present disclosure. According to one embodiment, method 500 preferably begins at step 502. As noted above, teachings of the present disclosure may be implemented in a variety of configurations of information handling system 102. As such, the preferred initialization point for method 500 and the order of the steps 502-520 comprising method 500 may depend on the implementation chosen.

Figure 6A:
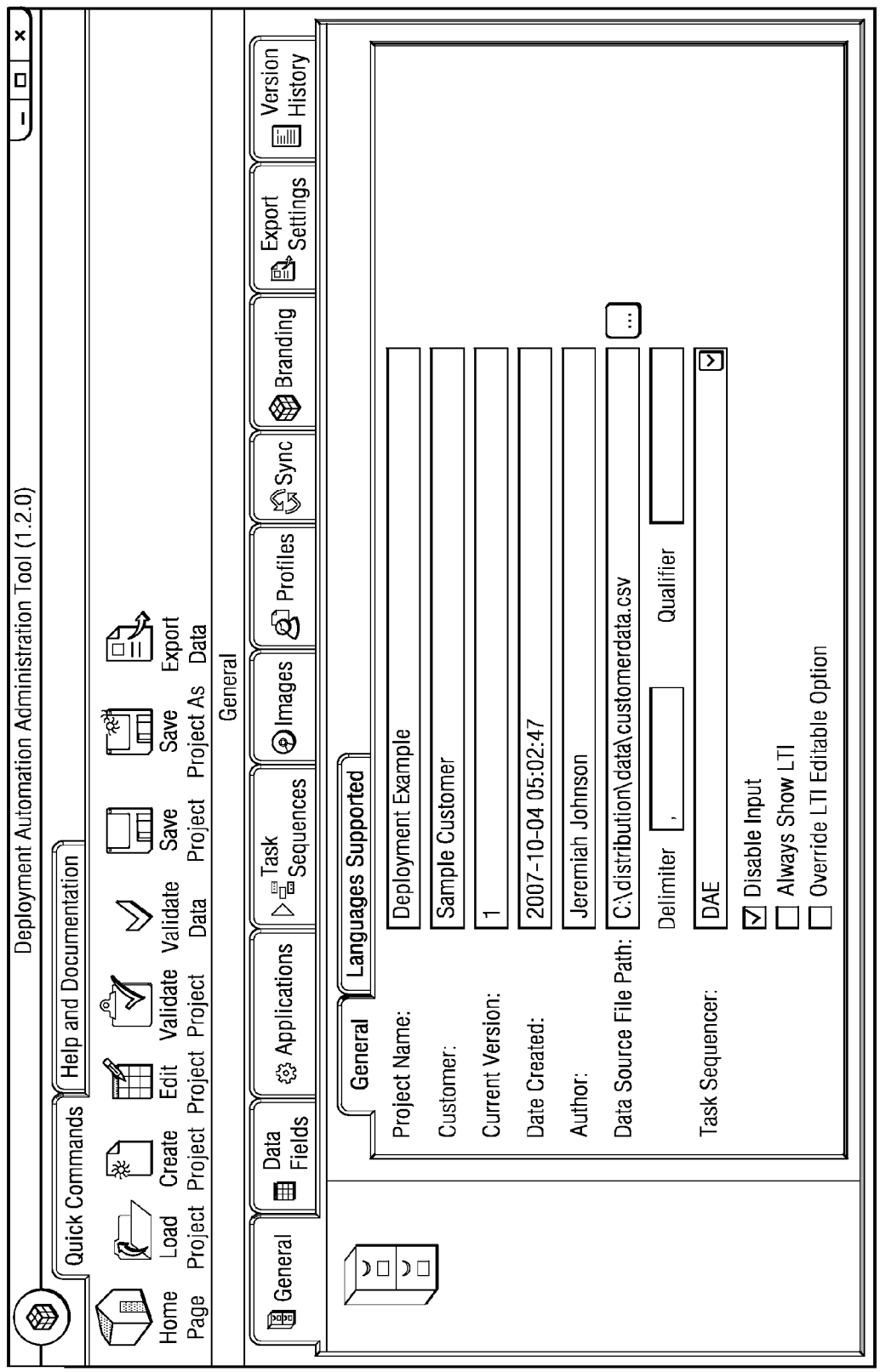
FIGS. 6A-6G illustrate example user interface screens displayed during a method for creating data to be used for an automated deployment a plurality of information handling systems, in accordance with an embodiment of the present disclosure.

At step 502, a user (e.g., an information technology professional, manufacturer, or vendor) may use management application 404 to begin a new deployment project. For example, as shown in FIG. 6A, a user may open a new deployment project and enter basic information regarding the deployment project (e.g., project name and/or and customer).

Figure 6B:
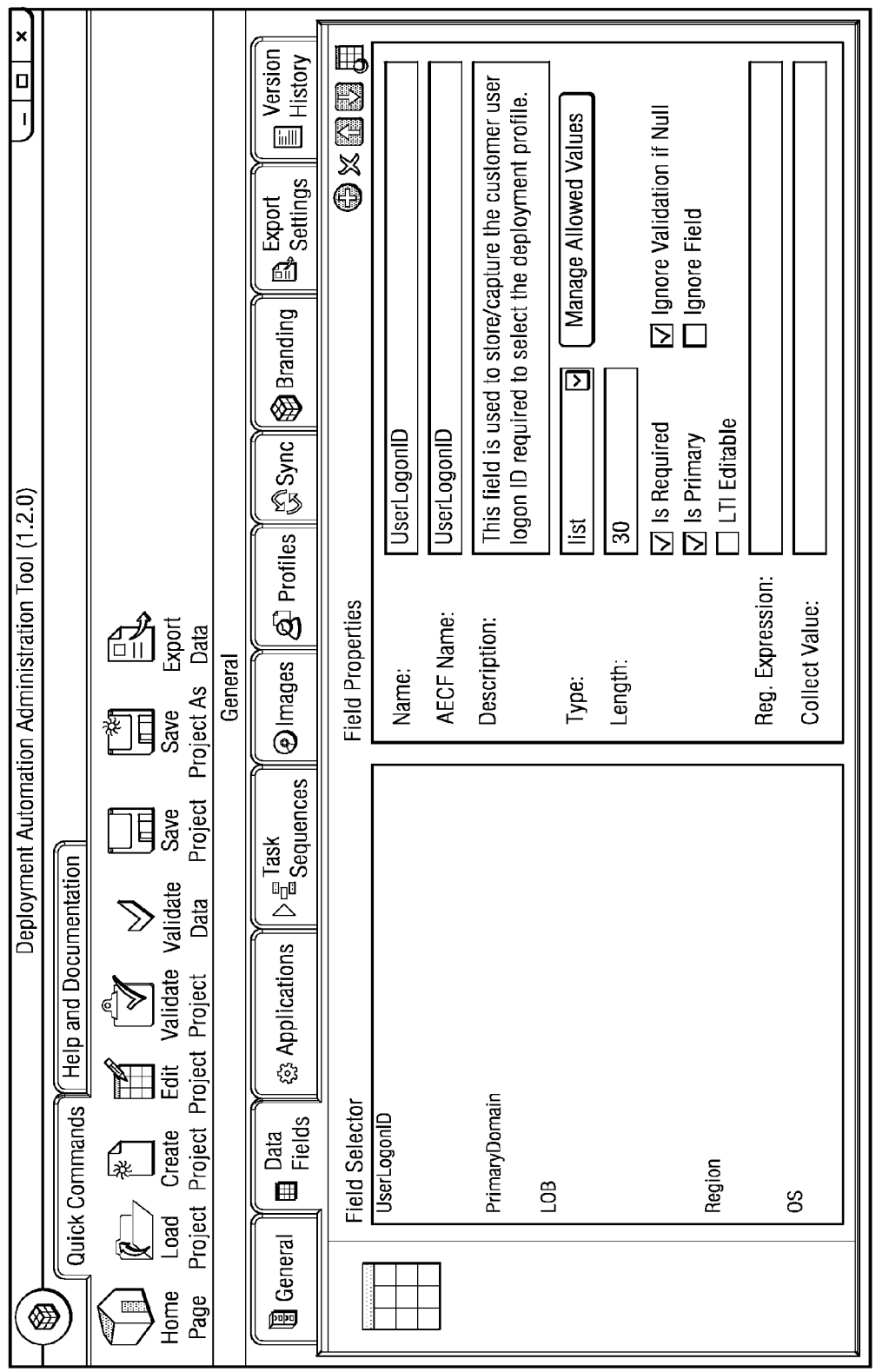

At step 504, the management application 404 user may create data fields for database 112 and for data to be entered during execution of deployment application 114. For example, as shown in FIG. 6B, the user may create data fields and field properties for data associated with profiles that may be stored in database 112 and/or entered during execution of deployment application 114 (e.g., "UserLogonID," "PrimaryDomain," "LOB," for line of business, "Region," and "OS"). For each field, the user may set properties related to the field as depicted in FIG. 6B. For example, the user may provide a description of the field, the minimum and/or maximum length of the field, whether the field is required for deployment, whether the field may be ignored, and/or the field type (e.g., whether a user of deployment application 114 may select possible values from a drop-down list or may simply type in an entry associated with the field).

At step 506, the management application 404 user may create a series of tasks to be executed by deployment application 114. For example, as shown in FIG. 6C, tasks to be performed by deployment application 114 may include "Install Selected OS," "Patch Installation," "Join Domain," "Application Profile Install," "Data Migration Backup," "Data Migration Restore," and "Cleanup."

At step 508, the management application 404 user may also set error-handling parameters for one or more tasks. For example, as depicted in FIG. 6C, the user may enter a range of desirable execution times for the task by setting a "Low Run Time" and a "High Run Time" for the task. The user may also set an "Expected Run Time" for the task. Accordingly, when deployment application 114 executes on an information handling system 102, the execution time for each task may be compared against the "Low Run Time," "High Run Time,"

and "Expected Run Time" parameters for such task to determine whether an error has occurred and/or whether a notification should be displayed regarding the task, as discussed in greater detail below.

Figure 6C:
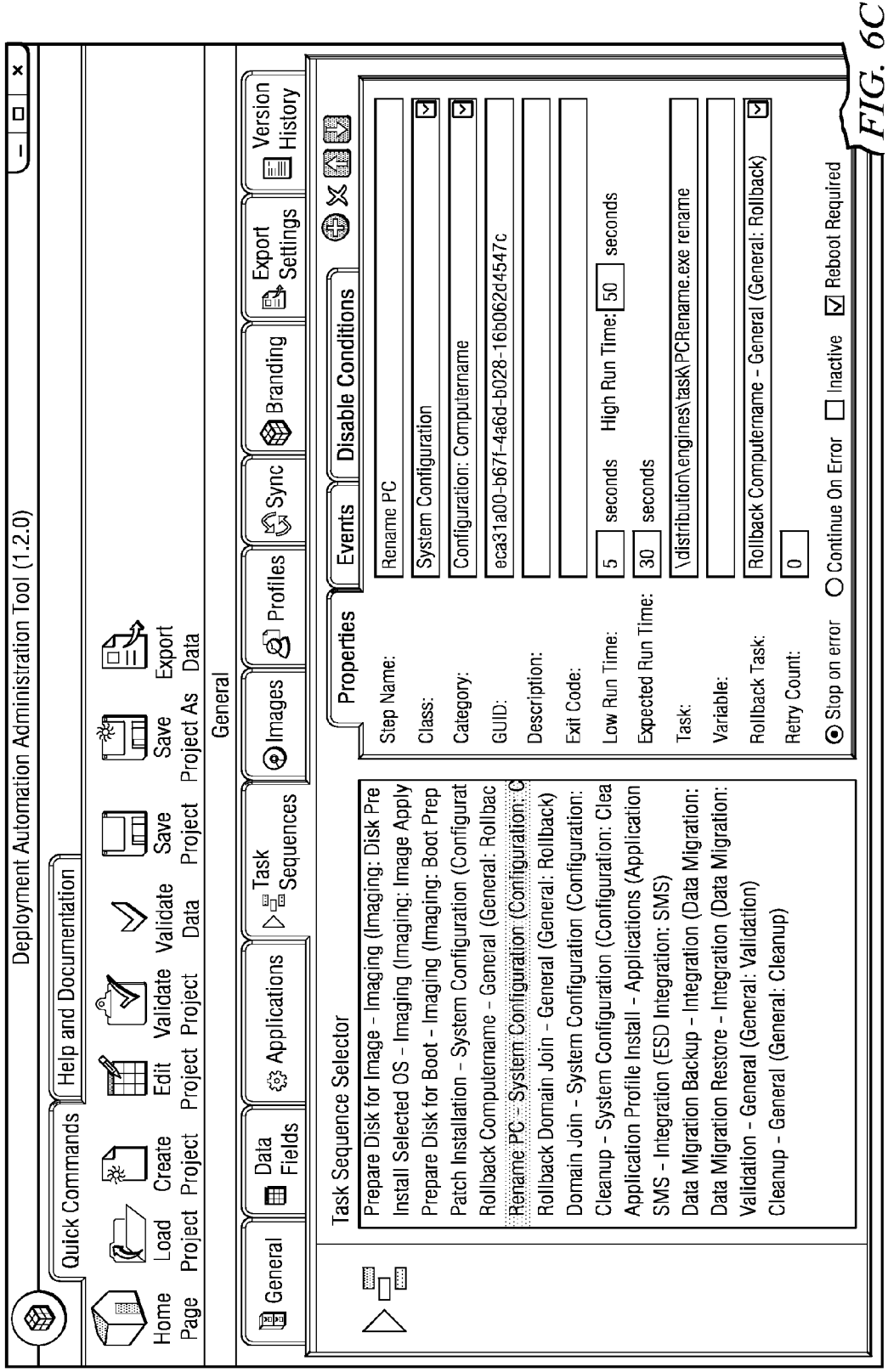

In addition, also as depicted in FIG. 6C, the management application 404 user may establish error-handling tasks for each task such as whether to retry execution of a task in the event of an error, a retry threshold limit of the maximum number of times execution of a task is to be retried, and whether or not execution of deployment application should be terminated in the event of an error condition, for example.

Figure 6D:
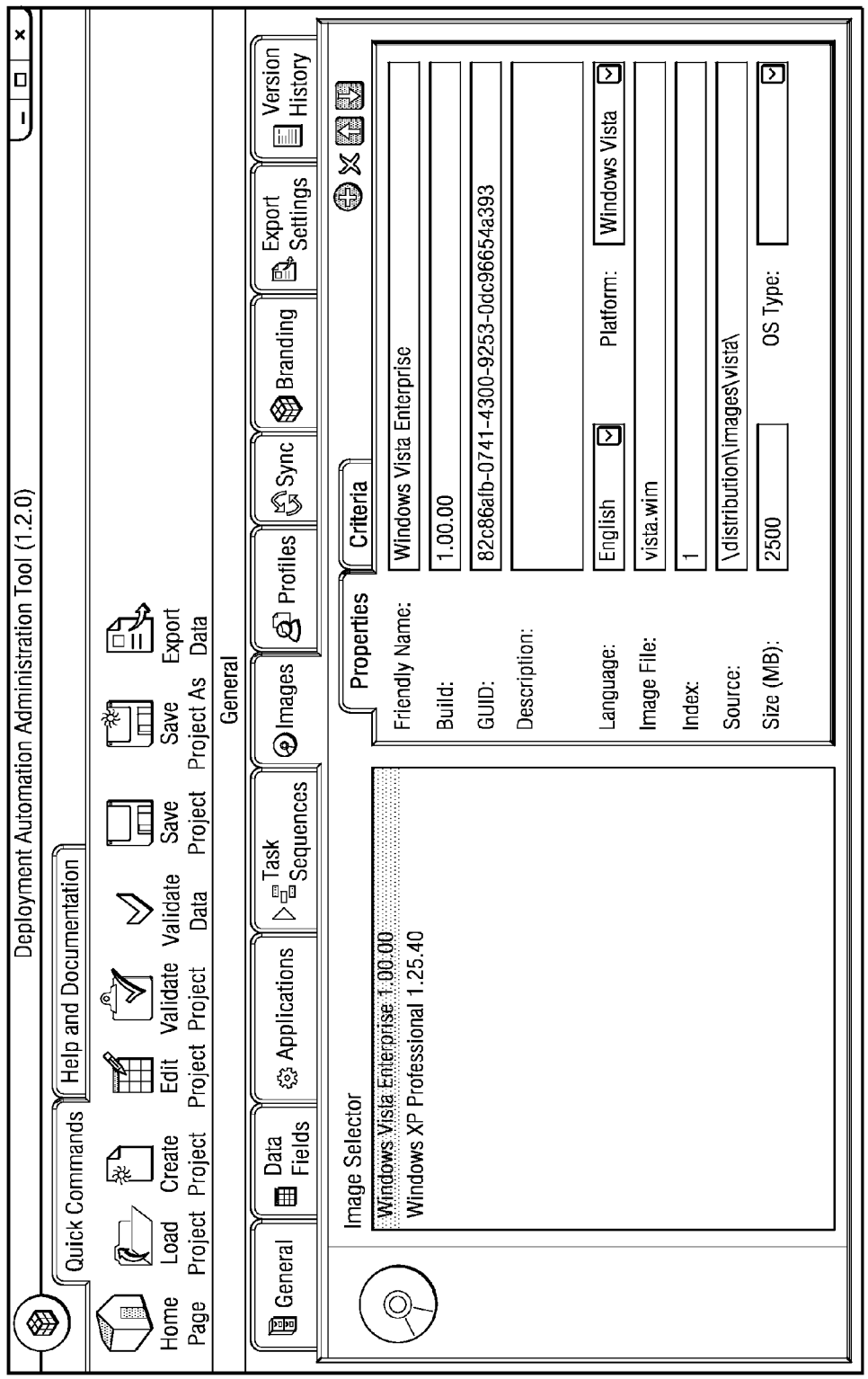

At step 510, the management application 404 user may determine and/or create the deployment container 110 to be pre-loaded onto information handling systems 102. For example, as shown in FIG. 6D, the user may choose among possible deployment containers 110.

Figure 6E:
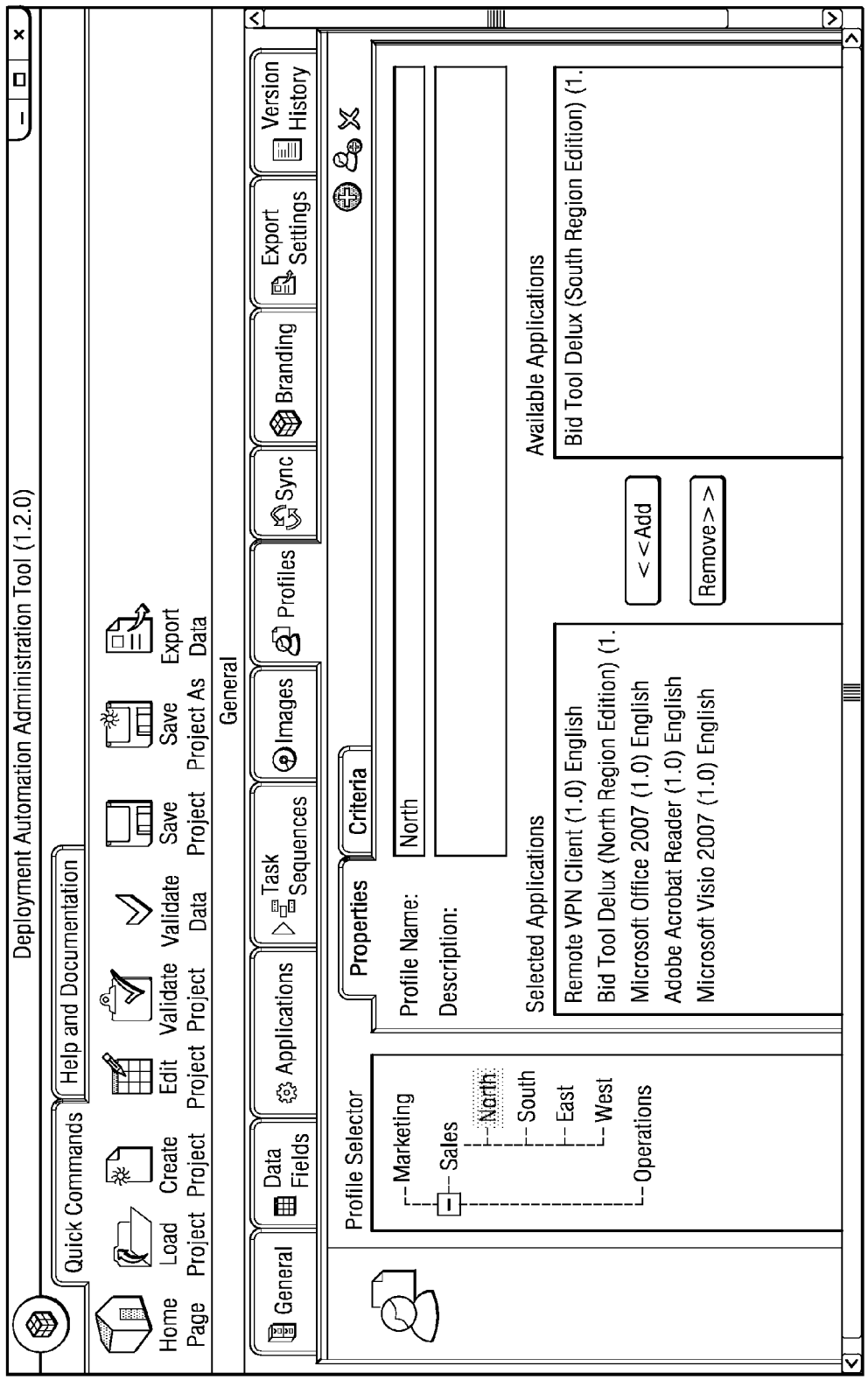
Figure 6F:
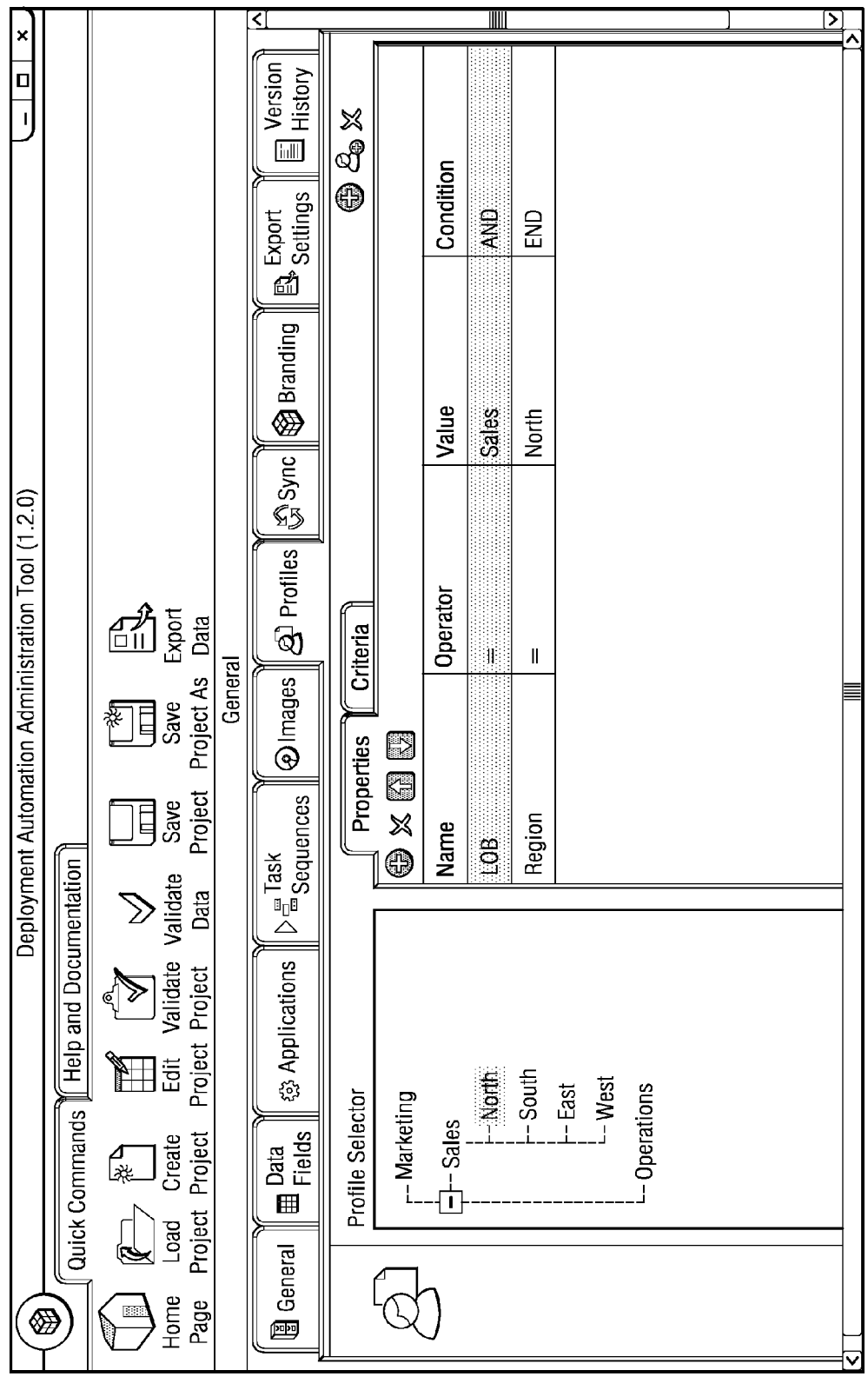

At step 512, the management application 404 user may determine the subsets of data images from deployment container 110 to be associated with one or more parameters of the profile information. For example, as shown in FIG. 6E, the user may create a profile entitled "North" and associate one or more applications with the profile. As shown in FIG. 6F, the user may establish criteria associated with the profile "North" (for example, "North" may include all profiles with an entry of "North" for data field "Region" in their respective profile information). Thus, in this specific example, a deployment application 114 executing method 200 may only deploy the particular subset of data images and/or applications associated with the profile "North" on information handling systems 102 for particular profiles that have a "Region" data field equal to "North" (e.g., where the "North" data is stored as available profile information in database 112 or entered as supplemental profile information).

Figure 6G:
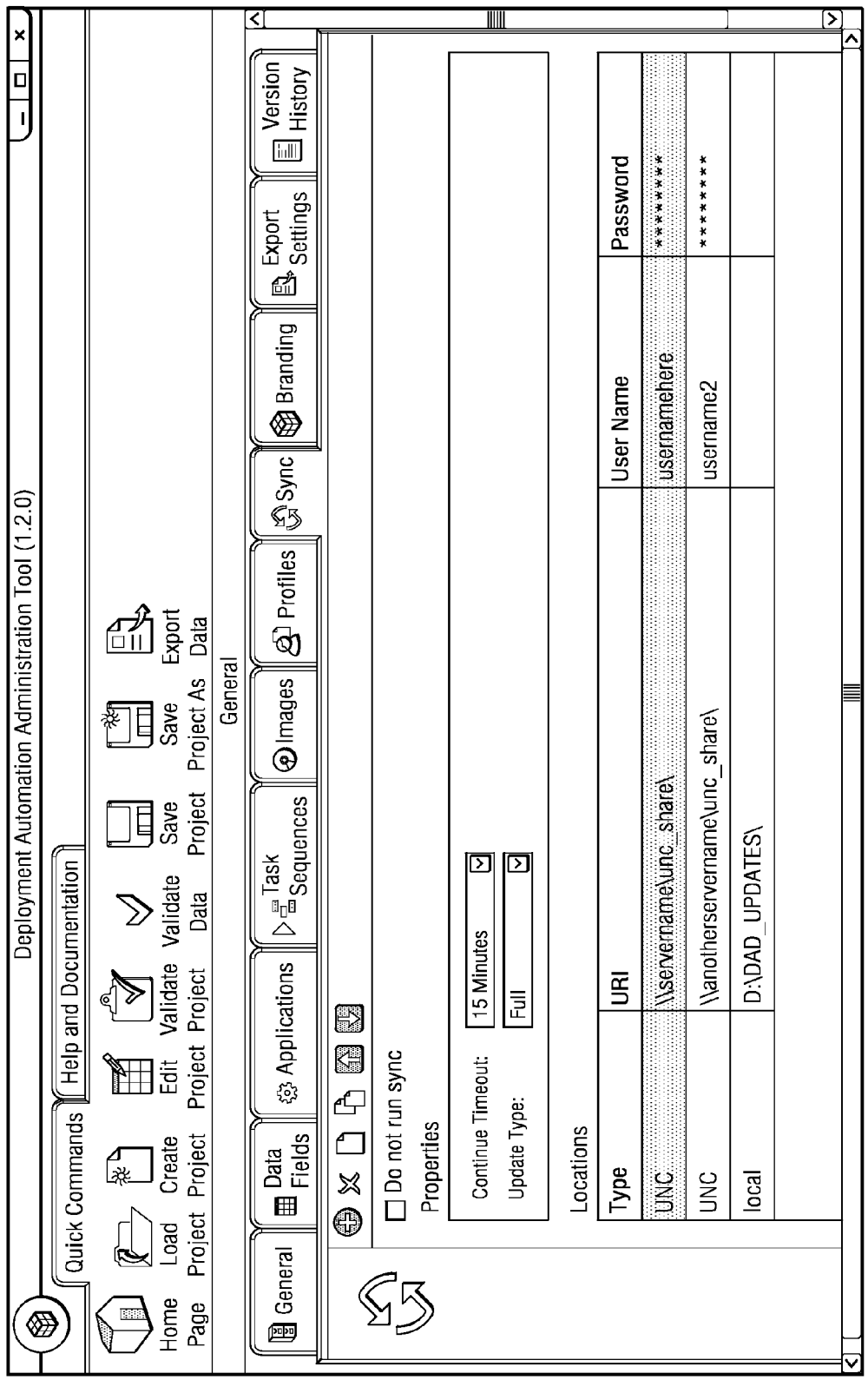

At step 514, the management application 404 user may determine one or more file locations where a deployment application 114 may access a synchronization file (see step 219 of method 200 and associated description above), as shown in FIG. 6G.

At step 516, management application 404 may automatically create all or a part of each of database 112, deployment container 110, and/or deployment application 114 based on at least the information entered into management application 404 in steps 504-514 above. In some embodiments, all or a portion of one or more of database 112, deployment container 110, and/or deployment application 114 may be separately created by the management application 404 user or another person. For example, in such embodiments, a user may create database 112 and store therein profile information associated with one or more profiles, while management application 404 may be used to create deployment container 110 and/or deployment application 114.

At step 518, any suitable technique may be used to store deployment container 110, database 112, and/or deployment application 114 on storage resources 108 of information handling systems 102. In other embodiments, one or more of deployment container 110, database 112, and deployment application 114 may be stored on an external storage resource (e.g., an external hard drive and/or USB flash drive) that may be locally interfaced with one or more information handling systems 102 in order to deploy and/or configure such information handling systems 102 in accordance with the methods and systems set forth in this disclosure.

At step 520, the information handling systems 102 may be delivered to their respective destinations and deployment application 114 may be executed on each information handling system 102 (e.g., such as described with respect to method 200 above) in order to customize the deployment and/or configuration of each information handling system 102. After completion of step 520, method 500 may end.

Although FIG. 5 discloses a particular number of steps to be taken with respect to method 500, it is understood that method 500 may be executed with greater or fewer steps than those depicted in FIG. 5. In addition, although FIG. 5 discloses a certain order of steps to be taken with respect to method 500, the steps comprising method 500 may be completed in any suitable order. Method 500 may be implemented using management station 402 or any other system operable to implement method 500. In certain embodiments, method 500 may be implemented partially or fully in software embodied in tangible computer-readable media.

Figure 7B:
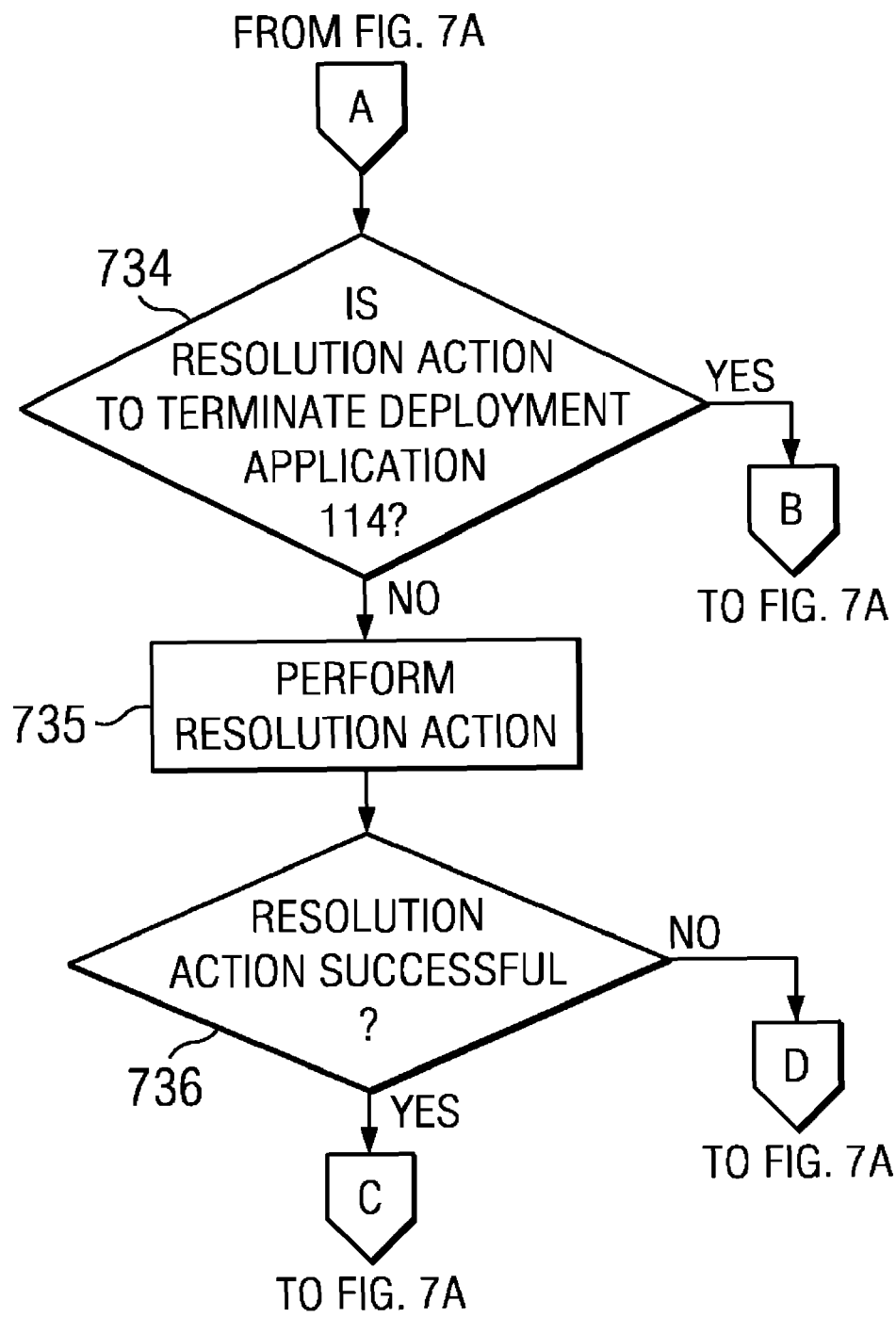

FIGS. 7A and 7B illustrate a flow chart of an example method 700 for managing the deployment of an information handling system 102, in accordance with the present disclosure. FIGS. 8A-8E illustrate example user interface screens that may be displayed on an information handling system 102 during method 700, in accordance with an embodiment of the present disclosure. According to one embodiment, method 700 preferably begins at step 702. As noted above, teachings of the present disclosure may be implemented in a variety of configurations of information handling systems 102. As such, the preferred initialization point for method 700 and the order of the steps 702-738 comprising method 700 may depend on the implementation chosen.

At step 702, deployment application 114 may initiate execution on an information handling system 102, and may gather information in order to deploy and/or configure the information handling system 102 (e.g., receipt of identifying information, available profile information, and/or supplemental profile information as depicted in steps 206-220 of method 200). At step 704, deployment application 114 may begin execution of a series of tasks (e.g., those tasks created in method 500) and may monitor the execution and completion of the tasks to determine the execution time of each task.

At step 706, deployment application 114 may automatically determine whether the execution time for the particular task is within a predetermined range of execution times (e.g., within the "Low Run Time" and "High Run Time" established for the task in step 508 of method 500). If the execution time for the particular task is not within the predetermined range of execution times (e.g., the task completed before the "Low Run Time" or has not completed before the "High Run Time"), method 700 may proceed to step 714. Otherwise, if the execution time for the particular task is within the predetermined range of execution times, method 700 may proceed to step 708.

At step 708, deployment application 114 may automatically determine whether the execution time for the particular task is less than an expected execution time (e.g., whether or not the task completed before the "Expected Run Time" established for the particular task in step 508 of method 500). If the execution time for the particular task is less than the expected execution time, method 700 may proceed to step 710. Otherwise, if the execution time for the particular task is more than the expected execution time, method 700 may proceed to step 712.

Figure 8A:
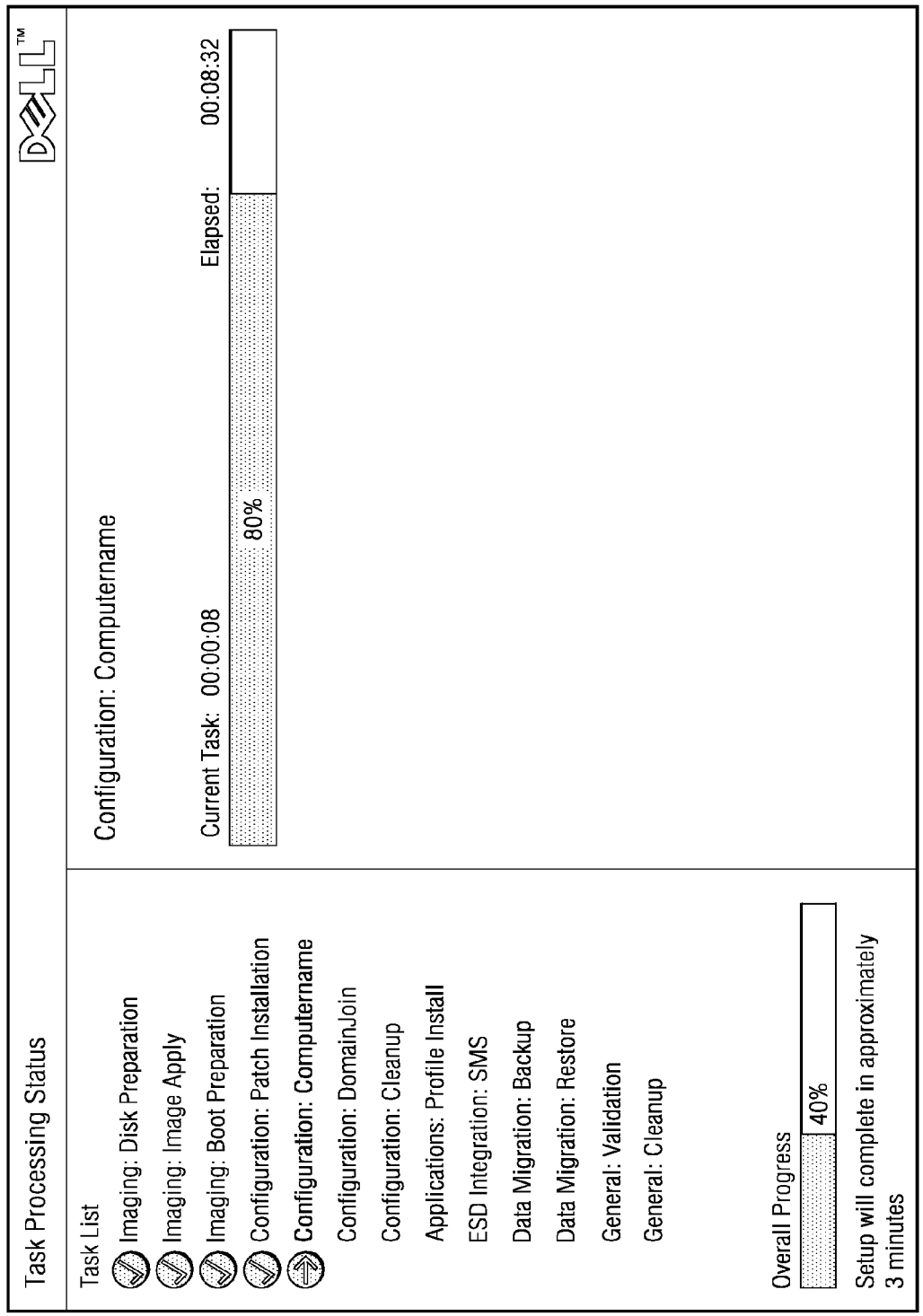
FIGS. 8A-8E illustrate example user interface screens displayed on an information handling system during a method for managing a deployment of an information handling system, in accordance with an embodiment of the present disclosure.
Figure 8B:

At step 710, in response to a determination that the execution time for the particular task is less than the expected duration time, deployment application 114 may display a low-priority notification at user interface 106 of information handling system 102. In some embodiments, a low-priority notification may include a simple display regarding the completion status of the task and/or deployment without any indication of an error condition, such as depicted in FIG. 8A, for example. In the same or alternative embodiments, a predefined color may be displayed to indicate a low-priority notification (e.g., the sidebar on the left-hand side of the screen in FIG. 8A may display green to indicate a low-priority notification). After completion of step 710, method 700 may proceed to step 713.

At step 712, in response to a determination that the execution time for the particular task is more than the expected duration time, but within the predetermined range of execution times, deployment application 114 may display a medium-priority notification at user interface 106 of information handling system 102. In some embodiments, a medium-priority notification may include a simple display regarding the completion status of the task and/or deployment without any indication of an error condition, such as depicted in FIG. 8A, for example. In the same or alternative embodiments, a predefined color may be displayed to indicate a medium-priority notification (e.g., the sidebar on the left-hand side of the screen in FIG. 8A may display yellow to indicate a medium-priority notification). After completion of step 712, method 700 may proceed to step 713.

At step 713, deployment application 114 may communicate the displayed notification and execution status of the task to management station 402 via network 406, as described in greater detail with respect to the discussion of step 716 below. After execution of step 713, method 700 may proceed to step 738.

At step 714, in response to a determination at step 706 that the execution time for the particular task is not within the predetermined range of execution times, deployment application 114 may display a high-priority notification at user interface 106 of information handling system 102. For example, a message such as that depicted in FIG. 8B and/or a prompt such as that depicted in FIG. 8C may be displayed to indicate a high-priority and/or error condition. In the same or alternative embodiments, a predefined color may be displayed to indicate a high-priority notification (e.g., the sidebar on the left-hand side of the screen in FIGS. 8B and/or 8C may display red to indicate a medium-priority notification).

Accordingly, as discussed above, deployment application 114 may display color-based notifications to a user interface 106 to aid in the monitoring and/or management of a large-scale deployment. For example, if a large-scale deployment to numerous information handling systems 102 is undertaken, an information technology professional or other person overseeing the deployment may be able to determine from a distance whether each information handling system 102 is in a low-, medium-, or high-priority state. Thus, rather than individually interface with each information handling system 102 to determine its status, the information technology professional may glance at the displays of each information handling system 102 and interface only with those displaying the appropriate color-based medium- and/or high-priority notification.

At step 716, deployment application 114 may communicate the displayed notification and execution status of the task to management station 402 via network 406. In some embodiments, management application 404 may display the status information and/or notification priority status of one or more information handling systems 102 to a user interface associated with management station 402 as shown in FIGS. 9A and 9B.

Figure 9A:
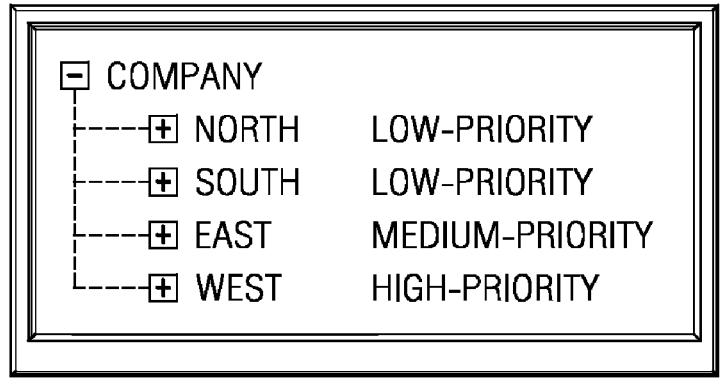
FIGS. 9A and 9B illustrate example user interface screens displayed on a management station during a method for managing a deployment of an information handling system, in accordance with an embodiment of the present disclosure.
Figure 9B:
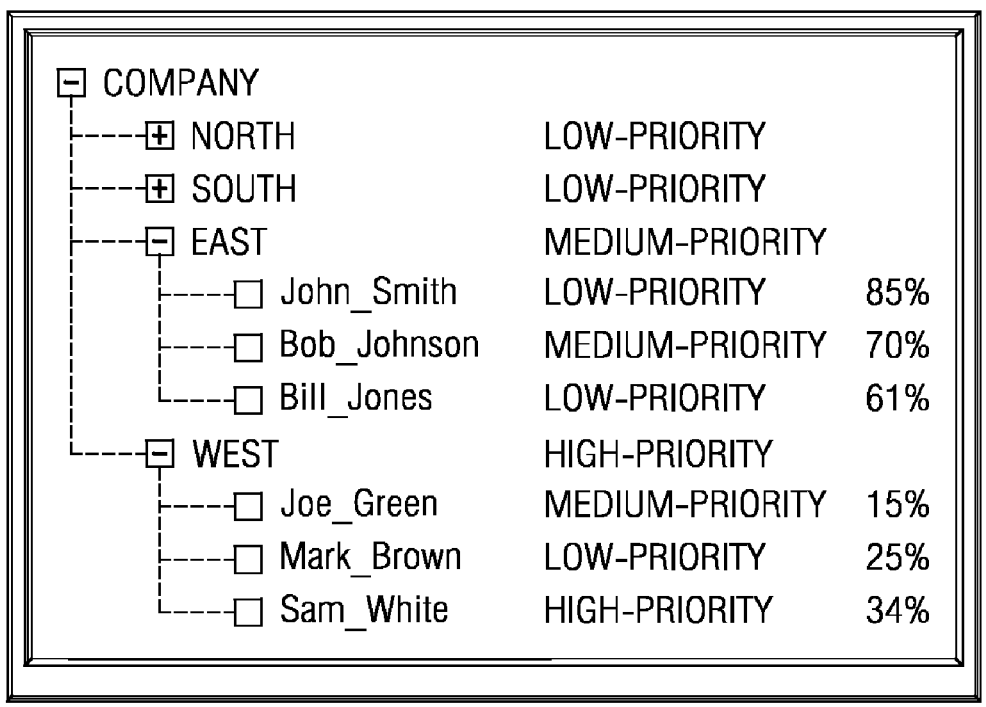

FIGS. 9A and 9B illustrate example user interface screens that may be displayed on management station 404 during execution of method 700, in accordance with an embodiment of the present disclosure. As shown in FIG. 9A, information communicated from information handling systems 102 may be used to display status information regarding a particular subset of the information handling systems. For example, the display may indicate whether any information handling systems 102 within a subset of information handling systems 102 have communicated a low-, medium-, or high notification. To illustrate, in the specific example of FIG. 9A, the group "WEST" has a high-priority notification, which may indicate that at least one information handling system 102 (or a predefined number or percentage of information handling systems 102) within the group "WEST" has communicated a high-priority notification. Similarly, the group "EAST" has a medium-priority notification, which may indicate that at least one information handling system 102 (or a predefined number or percentage of information handling systems 102) within the group "EAST" has communicated a medium-priority notification.

As depicted in FIG. 9B, the display at management station 402 may also allow a user to expand the information regarding the one or more subsets to allow the user to identify which particular information handling systems 102 are subject of the particular notifications as well as the completion status of the deployment and/or the particular tasks. In some embodiments, a user at management station 402 may obtain more information for a particular information handling system 102, for example by clicking or double-clicking the name (e.g. "Sam_White") associated with the information handling system 102.

In addition, the graphical representations of subsets and/or information handling systems 102 may also include a color indicating the notification type (e.g. red for high-priority, yellow for medium-priority, and green for low-priority). Although subsets and information handling systems 102 are depicted in a tree structure in FIGS. 9A and 9B, management application may display subsets, information handling systems 102, and their associated statuses and notifications, in any suitable manner.

Accordingly, as discussed above, management application 404 may display color-based notifications regarding information handling systems 102 and/or subsets thereof to a user interface associated with management station 402 to aid in the monitoring and/or management of a large-scale deployment. For example, if a large-scale deployment to numerous information handling systems 102 is undertaken, an information technology professional or other person overseeing the deployment may be able to determine remotely at a management station 402 whether each of remotely-located information handling systems 102 is in a low-, medium-, or high-priority state. Thus, if the information technology professional determines that a particular remotely-located information handling system requires human intervention (e.g., as indicated by a medium- or high-priority notification), the information technology professional may appropriately dispatch a person to address the error condition.

Turning again to FIGS. 7A and 7B, at step 718, in response to determining that the execution time for the particular task is not within the predetermined range of execution times (thus possibly indicating an error condition or failure of the task) deployment application 114 may determine whether it is configured to automatically attempt to re-execute the task. If deployment application 114 is configured to automatically attempt to re-execute the task, method 700 may proceed to step 720. Otherwise, if deployment application 114 is not configured to automatically attempt to re-execute the task, method 700 may proceed to step 730.

At step 720, deployment application 114 may determine the number of completed re-execution attempts for the particular task. At step 722, deployment application 114 may determine whether the number of completed re-execution attempts for the particular task exceeds a predefined retry threshold limit. The retry threshold may be defined or selected by a user, automatically determined by deployment application 114, or otherwise determined in any suitable manner.

If the number of completed re-execution attempts for the particular task has exceeded the predefined retry threshold, method 700 may proceed to step 724, where deployment application 114 may be terminated. In other embodiments, method 700 may proceed to step 730 if the number of completed re-execution attempts for the particular task has exceeded the retry threshold. Otherwise, if the number of completed re-execution attempts for the particular task has not exceeded the predefined retry threshold, method 700 may proceed to step 726.

At step 724, in response to a determination that the number of completed re-execution attempts for the particular task has been exceeded or a selected resolution action to terminate deployment application 114, deployment application 114 may terminate. After completion of step 724, method 700 may end.

At step 726, in response to a determination that the number of completed re-execution attempts for the particular task has not been exceeded, deployment application 114 may attempt to re-execute the particular task. At step 728, deployment application 114 may determine whether or not the attempted re-execution of the task was successful. If the attempt was successful, method 700 may proceed to step 738. Otherwise, if the attempt was unsuccessful, method 700 may proceed to step 720.

Figure 8C:
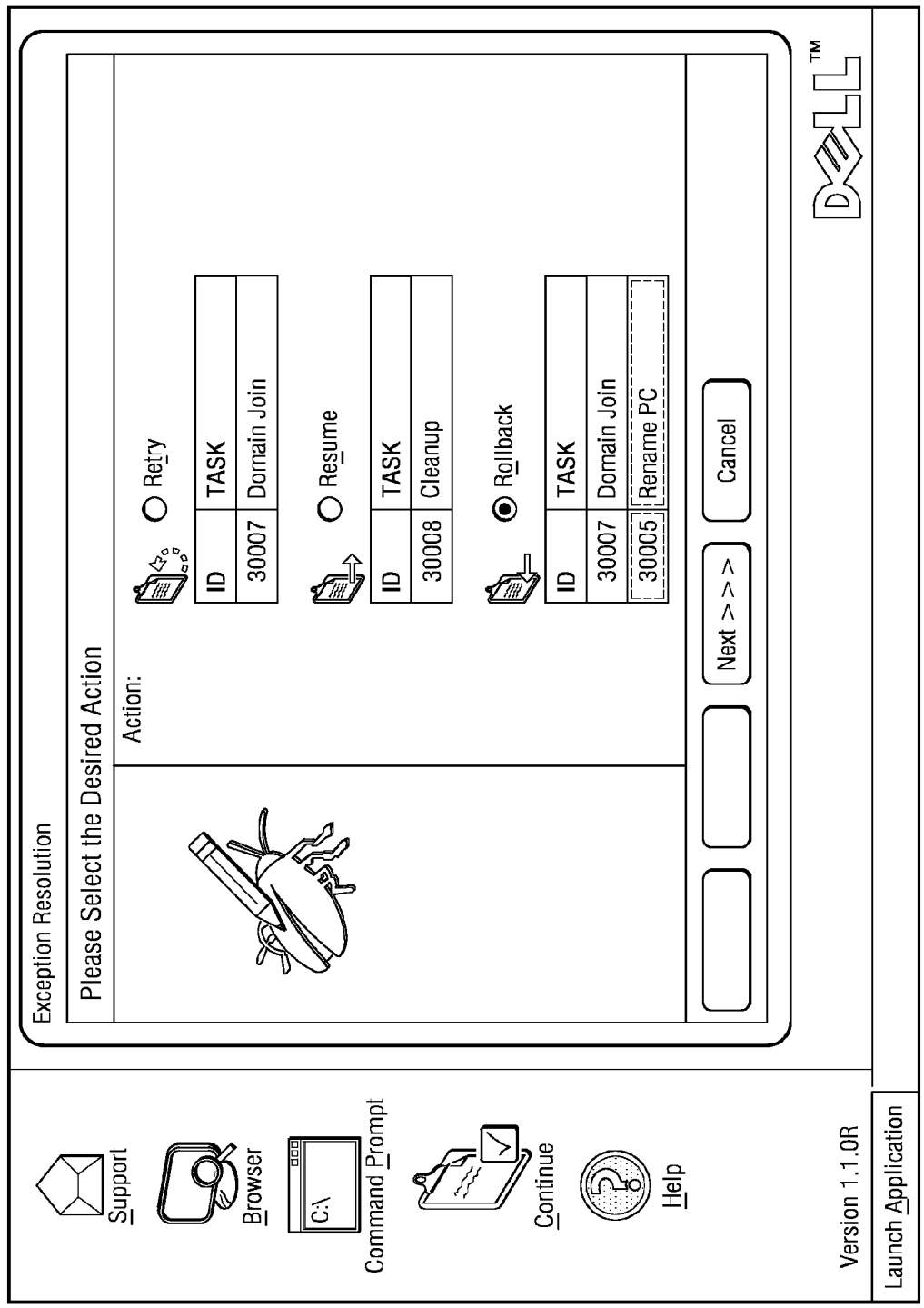

At step 730, in response to a determination that deployment application 114 is not configured to automatically attempt to re-execute the particular task, deployment application 114 may display a prompt at user interface 106 for selecting a resolution action. For example, as depicted in FIG. 8C, a prompt may be given to retry the particular task, ignore the error condition and resume deployment application 114, or to rollback execution of deployment application 114 to a point prior to the error condition.

Figure 8D:
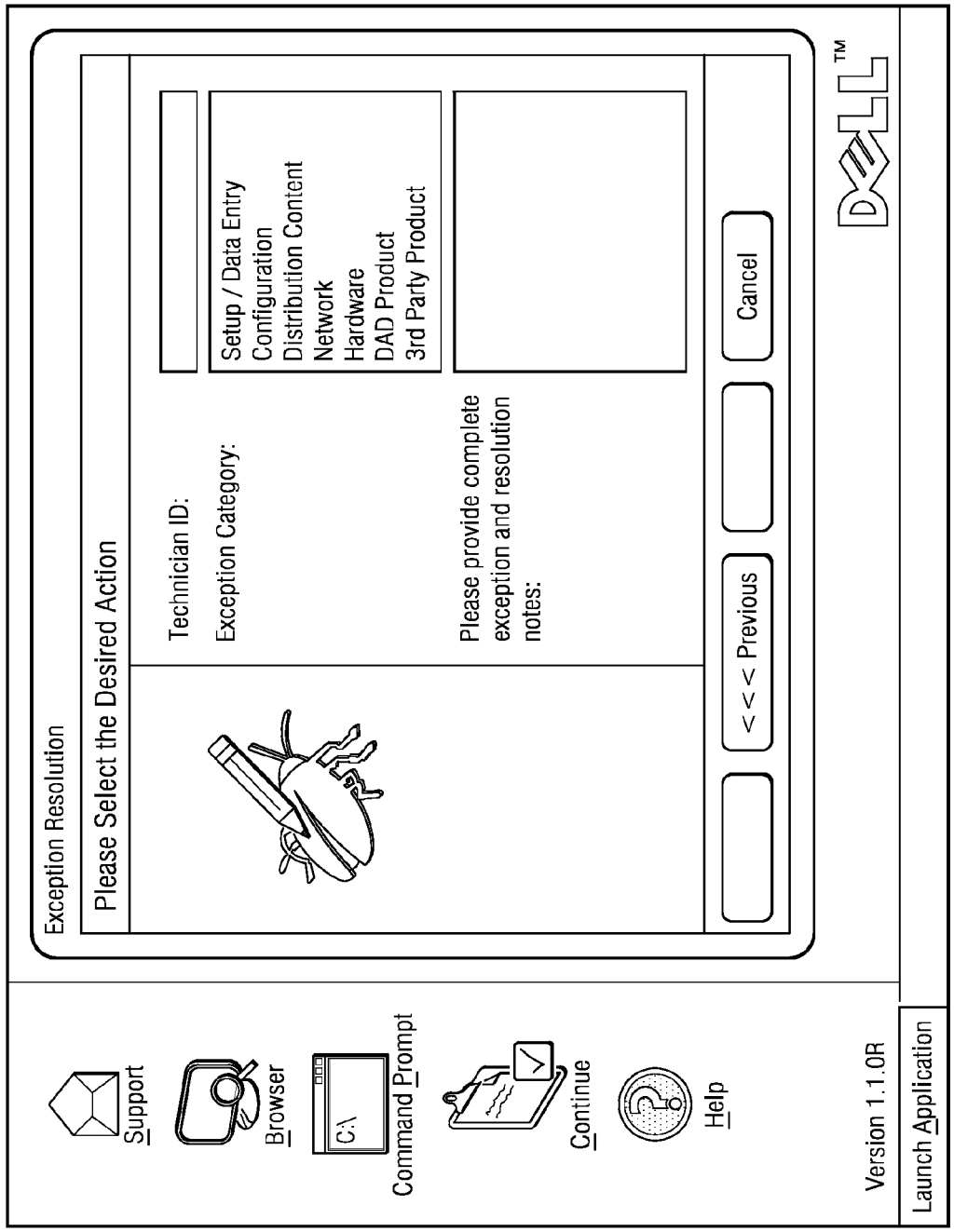
Figure 8E:
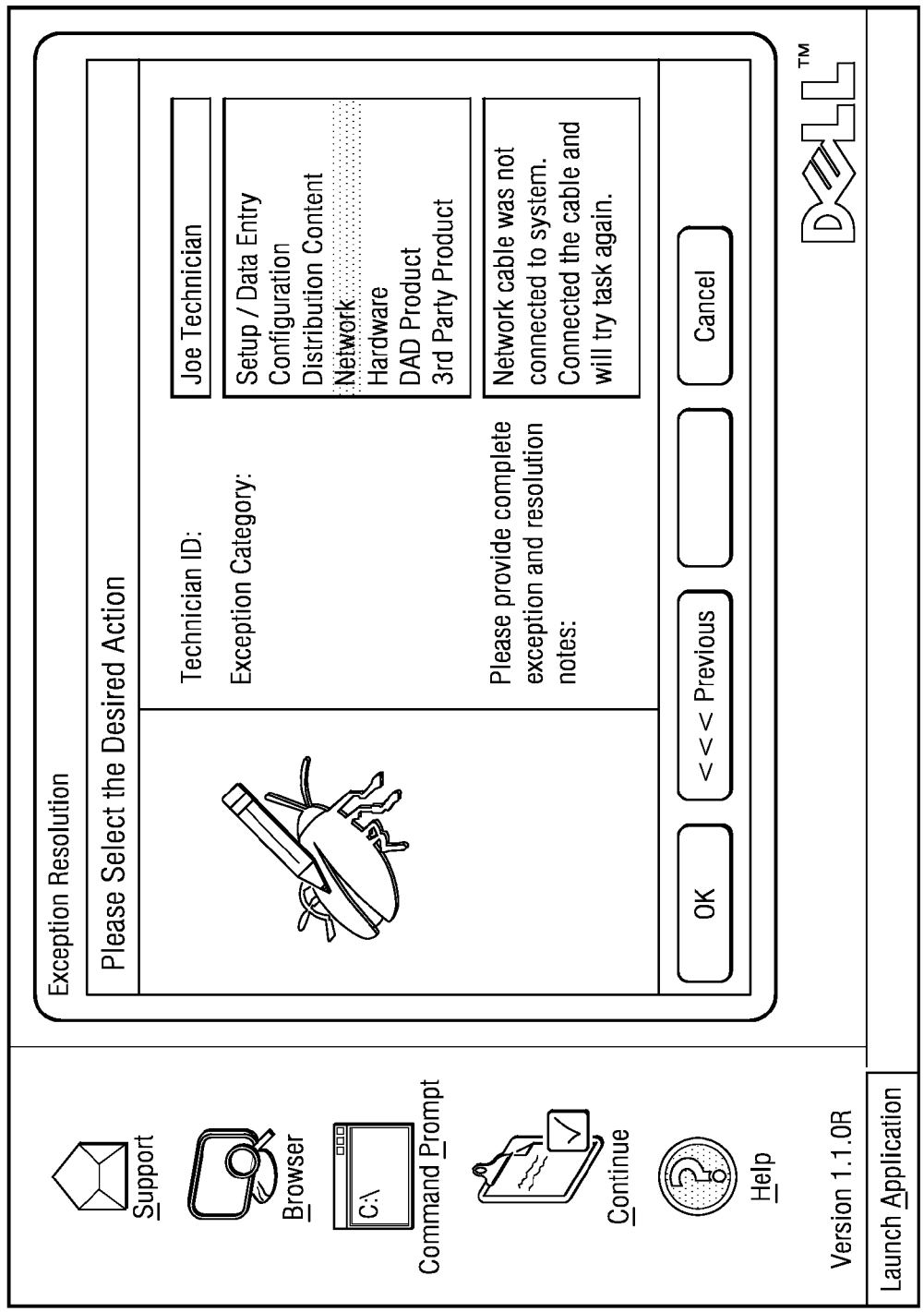

At step 732, deployment application 114 may record the selected resolution action. In some embodiments, deployment application 114 may further display additional prompts to facilitate recording of a resolution action. For example, as shown in FIGS. 8D and 8E, a technician selecting a resolution action may be prompted to input his or her technician identification, select an exception category, and/or provide notes or comments regarding the resolution selection. The collection of this additional information from a technician may provide a more sophisticated record of error-resolution procedures and/or may allow for accountability of selected resolution actions.

At step 734, deployment application 114 may determine whether the selected resolution action was to terminate deployment application 114. If the selection resolution action was to terminate the application, method 700 may proceed to step 724. Otherwise, if the selection resolution action was not to terminate the application, method 700 may proceed to step 735.

At step 735, deployment application 114 may perform the resolution action. At step 736, deployment application 114 may determine whether the selected resolution action was successful. If the selected resolution action was successful, method 700 may proceed to step 738. If the selected resolution action was not successful, method 700 may proceed again to step 730.

At step 738, in response to a determination that a task did not generate a high-priority notification, a determination that a an attempt to re-attempt a task with a high-priority notification was successful, or a determination that a selected resolution action for a task with a high-priority notification was successful, deployment application 114 may proceed to the next task. After step 738, method 700 may end.

Although FIGS. 7A and 7B disclose a particular number of steps to be taken with respect to method 700, it is understood that method 700 may be executed with greater or lesser steps than those depicted in FIGS. 7A and 7B. In addition, although FIGS. 7A and 7B disclose a certain order of steps to be taken with respect to method 700, the steps comprising method 700 may be completed in any suitable order. Method 700 may be implemented using one or more of information handling systems 102, management station 402, and/or any other system operable to implement method 700. In certain embodiments, method 700 may be implemented partially or fully in software embodied in tangible computer-readable media.

Using the methods and systems disclosed herein, many of the disadvantages of traditional approaches to deployment and/or configuration of information handling systems, particularly large-scale deployments, may be reduced or eliminated. For example, the methods and systems disclosed herein permit approaches to deployment and/or configuration that may not require significant network resources. The systems and methods disclosed may allow pre-loading of a generic deployment container on a plurality of information handling systems, wherein a subset of images from such deployment container is then deployed to the information handling system based on information received from a source local to the information handling system, thus potentially reducing the network trafficking burden associated with traditional approaches. The systems and methods disclosed herein also allow runtime exception handling and monitoring (including remote monitoring) functionality, thus potentially reducing management and monitoring burdens associated with traditional approaches.

The methods and systems disclosed herein may have numerous applications beyond those contemplated by the embodiments disclosed herein. As a non-limiting example, the approaches herein may be adapted to a factory and/or retail store setting whereby a deployment container, deployment application, and/or database may be pre-loaded onto a plurality of information handling systems, an order for an information handling system may be received, and the deployment application may be executed to customize installation of software and/or deployment of the information handling systems based on at least specifications set forth in the order (e.g., desired operating system, desired application software, drivers for desired peripheral hardware, settings related to desired user preferences, etc.). In some embodiments, the ordering process may be integrated with a deployment application such that an order is submitted and/or received by the deployment application and/or another program associated with the deployment application.

Although the present disclosure has been described in detail, it should be understood that various changes, substitutions, and alterations can be made hereto without departing from the spirit and the scope of the invention as defined by the appended claims.

What is claimed is:

1. A method for performing a task associated with an information handling system, comprising:
receiving at an information handling system identifying information from a source local to the information handling system, the identifying information identifying a particular one of a plurality of profiles;

automatically identifying the particular profile associated with the information handling system based on at least the identifying information received from the local source;
automatically accessing a database to:
access available profile information associated with the particular profile; and
identify unavailable supplemental profile information associated with the particular profile for performing a task associated with the information handling system;
automatically generating a customized user interface at the information handling system for inputting the supplemental profile information unavailable to the database, the customized user interface being customized based on at least the unavailable supplemental profile information;
receiving the supplemental profile information via the customized user interface; and
automatically performing the task based on at least one of the identifying information, the profile information accessed from the database, and the supplemental profile information received via the customized user interface.

2. A method according to claim 1, wherein the identifying information includes at least one of: a name of a particular class of end users, a name of a particular end user, a username of the particular end user, an identification number of the particular end user, a serial number of the information handling system, and a service code of the information handling system.

3. A method according to claim 1, wherein the database is stored on a computer-readable medium local to the information handling system.

4. A method according to claim 1, wherein performing the task comprises deploying selected data from a deployment container stored on computer-readable media local to the information handling system, the selected data based on at least one of the identifying information, the profile information accessed from the database, and the supplemental profile information received via the customized user interface.

5. A method according to claim 4, wherein the deployment container comprises a Windows Imaging Format (WIM) file.

6. A method according to claim 1, wherein performing the task comprises automatically installing and automatically configuring an operating system on the computer-readable media local to the information handling system based on at least one of the identifying information, the profile information accessed from the database, and the supplemental profile information received via the customized user interface.

7. A method according to claim 1, wherein performing the task comprises automatically installing and automatically configuring at least one application program on the computer-readable media local to the information handling system based on at least one of the identifying information, the profile information accessed from the database, and the supplemental profile information received via the customized user interface.

8. An information handling system, comprising:
a processor;
a memory communicatively coupled to the processor; and
local computer-readable media communicatively coupled to the processor, the computer-readable media having stored thereon:
a database; and
a program of instructions executable by the processor and operable to when executed:
receive identifying information from a source local to the information handling system, the identifying information identifying a particular one of a plurality of profiles;
automatically identify the particular profile associated with the information handling system based on at least the identifying information received from the local source;
automatically access the database to:
access available profile information associated with the particular profile; and
identify unavailable supplemental profile information associated with the particular profile for deploying the information handling system;
automatically generate a customized user interface for inputting the supplemental profile information unavailable to the database, the customized user interface being customized based on at least the unavailable supplemental profile information;
receive the supplemental profile information via the customized user interface; and
automatically perform a task associated with the information handling system based on at least one of the identifying information, the profile information accessed from the database, and the supplemental profile information received via the customized user interface.

9. An information handling system according to claim 8, wherein the identifying information includes at least one of: a name of a particular class of end users, a name of a particular end user, a username of the particular end user, an identification number of the particular end user, a serial number of the information handling system, and a service code of the information handling system.

10. An information handling system according to claim 8:
the computer-readable media further having stored thereon a deployment container;
the program of instructions further operable to, as part of automatically performing the task, automatically deploy selected data from the deployment container to the computer-readable media, the selected data based on at least one of the identifying information, the profile information accessed from the database, and the supplemental profile information received via the customized user interface.

11. An information handling system according to claim 8, wherein the deployment container comprises a Windows Imaging Format (WIM) file.

12. An information handling system according to claim 8, the program of instructions further operable to, as part of automatically performing the task, automatically install and automatically configure an operating system on the computer-readable media based on at least one of the identifying information, the profile information accessed from the database, and the supplemental profile information received via the customized user interface.

13. An information handling system according to claim 8, the program of instructions further operable to automatically install and automatically configure at least one application program on the computer-readable media based on at least one of the identifying information, the profile information accessed from the database, and the supplemental profile information received via the customized user interface.

14. A method for performing a task in an information handling system, comprising:

storing a database on computer-readable media, the database including profile information associated with one or more profiles;

storing a program of instructions on computer-readable media, the program of instructions operable to, when executed on an information handling system:

receive identifying information from a source local to the information handling system, the identifying information identifying a particular one of a plurality of profiles;

automatically identify the particular profile associated with the information handling system based on at least the identifying information received from the local source;

automatically access the database to:

access available profile information associated with the particular profile; and identify unavailable supplemental profile information associated with the particular profile for deploying the information handling system;

automatically generate a customized user interface for inputting the supplemental profile information unavailable to the database, the customized user interface being customized based on at least the unavailable supplemental profile information;

receive the supplemental profile information via the customized user interface; and automatically perform a task associated with the information handling system based on at least one of the identifying information, the profile information accessed from the database, and the supplemental profile information received via the customized user interface.

15. A method according to claim 14, wherein the identifying information includes at least one of: a name of a particular class of end users, a name of a particular end user, a username of the particular end user, an identification number of the particular end user, a serial number of the information handling system, and a service code of the information handling system.

16. A method according to claim 14, further comprising storing at least one of the database and the program of instructions on computer-readable media local to the information handling system.

17. A method according to claim 14, wherein the deployment container comprises a Windows Imaging Format (WIM) file.

18. A method according to claim 14, further comprising:

storing a deployment container on computer-readable media local to the information handling system; and wherein the program of instructions is further operable to, as part of automatically performing the task, automatically deploy selected data from the deployment container to computer-readable media local to the information handling system, the selected data based on at least one of the identifying information, the profile information accessed from the database, and the supplemental profile information received via the customized user interface.

19. A method according to claim 14, the program of instructions further operable to, as part of automatically performing the task, automatically install and automatically configure an operating system on the computer-readable media based on at least one of the identifying information, the profile information accessed from the database, and the supplemental profile information received via the customized user interface.

20. A method according to claim 14, the program of instructions further operable to, as part of automatically performing the task, automatically install and automatically configure at least one application program on the computer-readable media based on at least one of the identifying information, the profile information accessed from the database, and the supplemental profile information received via the customized user interface.

21. An article of manufacture, comprising:

a computer readable medium; and computer-executable instructions carried on the computer readable medium, the instructions readable by a processor, the instructions, when read and executed, for causing the processor to:

receive identifying information from a source local to an information handling system, the identifying information identifying a particular one of a plurality of profiles;

automatically identify the particular profile associated with the information handling system based on at least the identifying information received from the local source;

automatically access the database to:

access available profile information associated with the particular profile; and identify unavailable supplemental profile information associated with the particular profile for deploying the information handling system;

automatically generate a customized user interface for inputting the supplemental profile information unavailable to the database, the customized user interface being customized based on at least the unavailable supplemental profile information;

receive the supplemental profile information via the customized user interface; and automatically perform a task associated with the information handling system based on at least one of the identifying information, the profile information accessed from the database, and the supplemental profile information received via the customized user interface.

22. An information handling system according to claim 21, wherein the identifying information includes at least one of: a name of a particular class of end users, a name of a particular end user, a username of the particular end user, an identification number of the particular end user, a serial number of the information handling system, and a service code of the information handling system.

23. An information handling system according to claim 21, the instructions further operable to, as part of automatically performing the task, automatically deploying selected data from a deployment container stored on computer-readable media local to the information handling system, the selected data based on at least one of the identifying information, the profile information accessed from the database, and the supplemental profile information received via the customized user interface.

24. An information handling system according to claim 21, wherein the deployment container comprises a Windows Imaging Format (WIM) file.

25. An information handling system according to claim 21, the instructions further operable to, as part of automatically performing the task, automatically install and automatically configure an operating system on the computer-readable media based on at least one of the identifying information, the profile information accessed from the database, and the supplemental profile information received via the customized user interface.

26. An information handling system according to claim 21, the instructions further operable to automatically install and automatically configure at least one application program on the computer-readable media based on at least one of the identifying information, the profile information accessed from the database, and the supplemental profile information received via the customized user interface.

* * * * *